(12) United States Patent
Cioffi et al.

(10) Patent No.: US 12,267,123 B2
(45) Date of Patent: *Apr. 1, 2025

(54) SYSTEMS AND METHODS FOR IMPLEMENTING HIGH-SPEED WAVEGUIDE TRANSMISSION OVER WIRES

(71) Applicant: ASSIA SPE, LLC, Wilmington, DE (US)

(72) Inventors: John Matthew Cioffi, Atherton, CA (US); Kenneth J. Kerpez, Long Valley, NJ (US); Chan-Soo Hwang, Seoul (KR); Ioannis Kanellakopoulos, Redwood City, CA (US)

(73) Assignee: ASSIA SPE, LLC, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,251

(22) Filed: Feb. 28, 2022

(65) Prior Publication Data

US 2022/0182099 A1 Jun. 9, 2022

Related U.S. Application Data

(63) Continuation of application No. 15/969,729, filed on May 2, 2018, now Pat. No. 11,290,150.
(Continued)

(51) Int. Cl.
*H04B 3/46* (2015.01)
*H04B 3/52* (2006.01)
(Continued)

(52) U.S. Cl.
CPC ............... *H04B 3/46* (2013.01); *H04B 3/52* (2013.01); *H04B 7/0634* (2013.01); *H04B 17/12* (2015.01); *H04L 27/0002* (2013.01)

(58) Field of Classification Search
CPC .......... H04B 3/46; H04B 7/0634; H04B 3/52; H04B 17/12; H04L 27/0002
See application file for complete search history.

(56) References Cited

U.S. PATENT DOCUMENTS 6,591,084 B1 7/2003 Chuprun et al.
9,312,919 B1 4/2016 Barzegar et al.
(Continued)

FOREIGN PATENT DOCUMENTS

CN 1502189 A 6/2004
CN 1717900 A 1/2006
(Continued)

OTHER PUBLICATIONS

European notice of allowance mailed Mar. 21, 2023 in related European patent application No. 18795224.7, (9 pgs).
(Continued)

*Primary Examiner* — Dhaval V Patel
(74) *Attorney, Agent, or Firm* — Michael North; North Weber & Baugh

(57) ABSTRACT

Various embodiments describe communication systems for implementing high-speed transmission systems using waveguide-mode transmission over wires. In certain examples, a communication system uses wire pairs as "waveguides" that transmit data at high frequencies and speeds. The data is transmitted through wave propagation that takes various forms, such as surface waves and Total Internal Reflection (TIR) waves.

20 Claims, 19 Drawing Sheets

Related U.S. Application Data

(60) Provisional application No. 62/500,951, filed on May 3, 2017.

(51) Int. Cl.
  _H04B 7/06_ (2006.01)
  _H04B 17/12_ (2015.01)
  _H04L 27/00_ (2006.01)

(56) References Cited

U.S. PATENT DOCUMENTS

| | | | |
|---|---|---|---|
| 2011/0160643 A1* | 6/2011 | Dacey, Jr. ................ | A61L 2/00 604/21 |
| 2016/0149731 A1 | 5/2016 | Henry et al. | |
| 2016/0177642 A1* | 6/2016 | Foley .................... | E21B 21/01 175/207 |
| 2017/0011574 A1* | 1/2017 | Noest ................ | G07C 9/00896 |
| 2017/0018833 A1 | 1/2017 | Henry et al. | |
| 2017/0079024 A1 | 3/2017 | Gerszberg | |
| 2018/0159230 A1* | 6/2018 | Henry .................... | H01Q 15/24 |

FOREIGN PATENT DOCUMENTS

| | | |
|---|---|---|
| CN | 101166074 A | 4/2008 |
| CN | 102037694 A | 4/2011 |
| CN | 103733555 A | 7/2011 |
| CN | 103907324 A | 12/2011 |
| CN | 106256093 A | 5/2015 |
| CN | 106464317 A | 5/2015 |
| CN | 106027438 A | 7/2016 |
| CN | 106059654 A | 8/2016 |
| JP | 5671933 B2 | 2/2015 |
| KR | 101709076 B2 | 2/2017 |
| WO | 2016013188 A1 | 1/2016 |
| WO | 2017065906 A1 | 4/2017 |

OTHER PUBLICATIONS

Korean office action mailed Apr. 28, 2022 in related Korean patent application No. 10-2022-7002980, (5 pgs).
Response to Korean office action filed Jun. 27, 2022 in related Korean patent application No. 10-2022-7002980, (16 pgs).
European office action mailed Oct. 19, 2022 in related European patent application No. 18795224.7, (9 pgs).
Australian office action mailed Nov. 8, 2022 in related Australian patent application No. 2021225221, (3 pgs).
Canadia notice of allowance mailed Sep. 21, 2022 in related Canadian patent application No. 3,053,942, (1 pg).
Notice of Allowance mailed Sep. 8, 2022 in related Korean patent application No. 10-2022-7002980, (7 pgs).
Notice of Allowance mailed Aug. 7, 2022 in related Singaporean patent application No. 11201907716X, (6 pgs).
Chinese office action mailed Oct. 16, 2023 in related Chinese patent application No. 202210430623.7, (14 pgs).
Response to Chinese office action filed Nov. 20, 2023 in related Chinese patent application No. 202210430623.7, (10 pgs).
Notice of Allowance mailed Jan. 4, 2024 in related Chinese patent application No. 202210430623.7, (8 pgs).
Indian office action mailed Dec. 27, 2023, instructions to abandon patent application sent Jan. 10, 2024, in related Indian patent application No. 201927033783, (3 pgs).
The extended European Search Report mailed Apr. 18, 2024 in related European patent application No. 23204291.1, (8 pgs).
Canadian office action mailed Aug. 9, 2024 in Canadian patent application No. 3,186,450, (4 pgs).
Response to Canadian office action filed Sep. 18, 2024 in Canadian patent application No. 3,186,450, (1 pgs).

* cited by examiner

SYSTEMS AND METHODS FOR IMPLEMENTING HIGH-SPEED WAVEGUIDE TRANSMISSION OVER WIRES

CROSS REFERENCE TO RELATED APPLICATIONS

This present application is a continuation of and claims priority benefit to and commonly-assigned U.S. patent application Ser. No. 15/969,729, entitled "SYSTEMS AND METHODS FOR IMPLEMENTING HIGH-SPEED WAVEGUIDE TRANSMISSION OVER WIRES", filed May 2, 2018, and claims priority under 35 U.S.C. § 119(e) of Provisional Patent Application No. 62/500,951, entitled "SYSTEMS AND METHODS FOR IMPLEMENTING HIGH-SPEED DSL SYSTEMS," filed May 3, 2017; Provisional Patent Application No. 62/504,453, entitled "SYSTEMS AND METHODS FOR IMPLEMENTING HIGH-SPEED DSL SYSTEMS," filed May 10, 2017; Provisional Patent Application No. 62/513,227, entitled, "TERABIT DSLs," filed May 31, 2017; and Provisional Patent Application No. 62/513,834, entitled "TESTING OF WAVEGUIDE-MODE DSL CHANNELS," filed Jun. 1, 2017, all applications of which are hereby incorporated herein by reference in their entireties.

BACKGROUND

A. Technical Field

The present disclosure relates to wired communication systems, and more particularly, to systems and methods for implementing high-speed data transmission systems using waveguide-mode transmission over wires.

B. Description of the Related Art

Digital Subscriber Line (DSL) is a communication technology that uses the copper telephone network infrastructure. A twisted pair carries electromagnetic waves using the transverse electromagnetic (TEM) mode (or, equivalently, loop-current TEM mode) where the transverse electric field is created by the electric potential difference between tip and ring wire and the transverse magnetic field is created by the conduction current between tip and ring wire. DSL speed ranges from 500 Kbps to 5 Gbps.

Even though the speed of DSL has been increasing as the technology improves, DSL speed has been historically slower than the communication techniques based on optic fiber cables (or, fiber for short) because twisted pair cannot support large bandwidth when used as a transmission line because of the large propagation losses at high frequency. Currently, most DSL systems operate in transmission-line mode at frequencies below 200-800 MHz; therefore, the maximum used transmission-line-mode bandwidth is less than 800 MHz. A single strand of fiber has a higher capacity than a single twisted pair because typical fiber communications systems operate at about 300 THz, which is about 1,000,000 times higher than the frequencies used by current DSL transmission-line modes. Additionally, fiber installation costs are often prohibitively expensive, whereas DSL systems use the existing copper twisted pair infrastructure so that cost of deployment is typically much lower. Often, the advantage of fiber's higher speed to the user's business is not sufficient to justify the higher installation fee.

BRIEF DESCRIPTION OF THE DRAWINGS

References will be made to embodiments of the present disclosure, examples of which may be illustrated in the accompanying figures. These figures are intended to be illustrative, not limiting. Although the present disclosure is generally described in the context of these embodiments, it should be understood that it is not intended to limit the scope of the present disclosure to these particular embodiments.

DETAILED DESCRIPTION OF THE PREFERRED EMBODIMENTS

Figure 1:
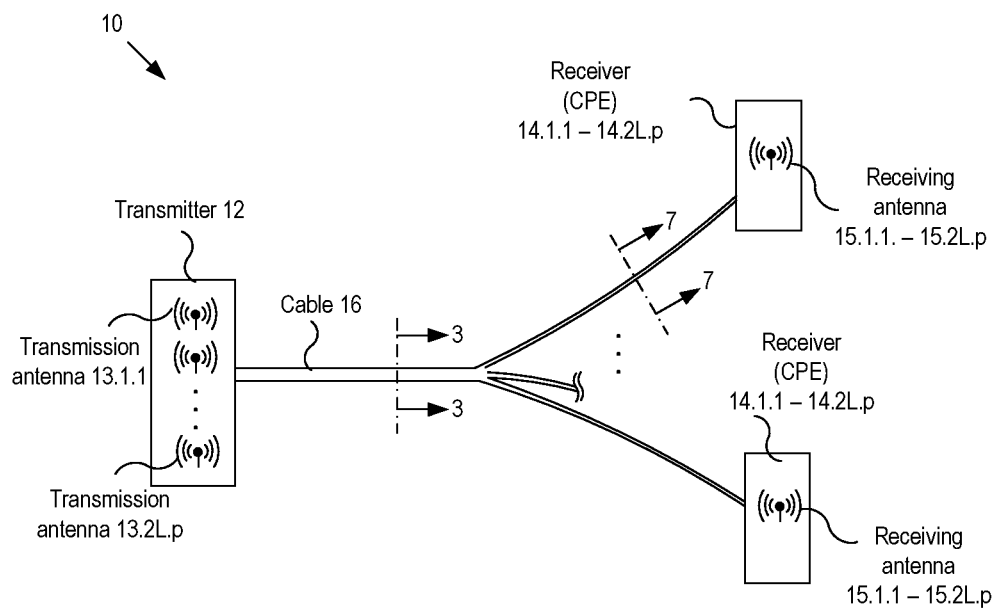
FIG. 1 shows a schematic diagram of a downstream network environment according to embodiments of the present disclosure.

In the following description, for purposes of explanation, specific details are set forth in order to provide an understanding of the present disclosure. It will be apparent, however, to one skilled in the art that the present disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components shown in diagrams are illustrative of exemplary embodiments of the disclosure and are meant to avoid obscuring the disclosure. It shall also be understood that throughout this discussion that components may be described as separate functional units, which may have sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, one skilled in the art shall recognize: (1) that certain steps may optionally be performed; (2) that steps may not be limited to the specific order set forth herein; and (3) that certain steps may be performed in different orders, including being done contemporaneously.

Reference in the specification to "one embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," or "in embodiments" in various places in the specification are not necessarily all referring to the same embodiment or embodiments.

In a conventional DSL system, the wire pairs connecting the transceivers (transmitter/receivers) on each side are acting as transmission lines; the voltage applied by each transmitter propagates through the wire pair and is read at the other end by the corresponding receiver. By contrast, various embodiments of the present invention disclose the use of the same wire pairs as "waveguides" that transmit data at much higher frequencies and at much higher speeds. The data is transmitted through wave propagation that takes various forms, such as surface waves and Total Internal Reflection (TIR) waves.

To increase communication speed, data transmission using copper wires' waveguide modes at near THz frequencies is proposed. A system that transmits data using a waveguide mode that propagates along the surface or parallel to a straight single wire may be implemented. In embodiments, a transmitter may send a surface wave to a receiver along a wire, where the wire may include a conductor core. At near THz frequencies, the wire may guide the propagation of the surface wave where axial electric field is created by the redistribution of a collection of electrons on a metal surface, called surface plasmon polaritons, and a transverse magnetic field is created by the displacement current. Unlike current DSL's transmission-line-mode methods at low frequencies, this mode at near THz frequencies has little dispersion and less path loss. The data transmission rates can be comparable to those currently used (or anticipated to be used) by fiber. The system may work reasonably well in the air, and dielectric (plastic) insulator around the wire may improve the transmission performance. However, the surface wave tends to "veer" from curved wires and the energy is lost into space, i.e., bending of the wire may cause attenuation of the received signal strength because the energy leaks. Moreover, splicing two waveguides together is difficult because it requires careful alignment of the central axes of two waveguides.

Other waveguide modes include TE1, TIR, TM2, TE2, and plasmonic TEM, along with the surface wave. These waveguide modes can be present when there is more than one metal conductor in the transmission cable. Some may veer less than the surface wave, but may have more or less attenuation. All of these together will be called "waveguide modes" and there may be significant overlap, as well as crosstalk, between the different modes. An ability to use all or some of these modes productively for each user without crosstalk and with sufficient reduction of the loss of energy caused by "veering off" would be a significant advance in the art. A waveguide mode signal is defined as a signal that propagates in accordance with any of the waveguide modes described above.

In embodiments, a transmitter (such as a DSLAM) may be remotely located from a receiver (such as a CPE). The wire between the transmitter and receiver may have numerous bending and splicing points, and the waveguide mode signal at the receiver may become too weak unless the energy loss is prevented. In embodiments, methods to transmit data in waveguide modes that may reduce the effect of the longitudinal curvatures and splicing of a single wire have been implemented.

FIG. 1 shows a schematic diagram of a downstream network environment 10 according to embodiments of the present disclosure. As depicted in FIG. 1, a transmitter 12 may simultaneously transmit data to one or more receivers 14.1.1-14.2L.p via a cable 16. There are up to L pairs of wires and thus 2L wires with p waveguide modes of transmission per wire. It is possible that the number of waveguide modes p used at the transmitter side could be different from the number of waveguide modes used at the receive side, but usually they would be the same. The transmitter 12 may be a fiber-fed point, such as, but not limited to, digital subscriber line access multiplexer (DSLAM), optical network unit (ONU), optical line terminal (OLT), distribution point unit (DPU), distribution point, terminal, cabinet, remote terminal. The transmitter 12 may have multiple antennas 13.1.1-13.2L.p, where there are up to L pairs of wires and thus 2L wires with p waveguide modes of transmission per wire. Each of the receivers 14.1.1-14.2L.p may be an individual customer premises equipment (CPE), such as "gateway", or network termination, and located at the customer's location. Each of the receivers 14.1.1-14.2L.p has one or more receiving antenna(s) 15.1.1-15.2L.p, where there are up to L pairs of wires and thus 2L wires with p waveguide modes of transmission per wire. Each wire may support multiple simultaneous transmission waveguide modes: such as the previously mentioned TM10, TE10, plasmonic TEM, and possibly additional modes such as TM2,0 or TE20 modes. TIR mode may be supported by the entire cable, particularly when it has a metal shield. Each transmission mode may be transmitted and received by its own antennas.

As shown in FIG. 1, the network environment 10 may be similar to the conventional DSL transmission system. In embodiments, the cable 16 may use the network lines to preserve the investment made in traditional telephone lines used for standard analog baseband telephone services. However, unlike the conventional DSL transmission system, the transmitter 12 and the receivers 14.1.1-14.2L.p communicate data using waveguide-mode signals that propagate along the cable 16.

Figure 2:
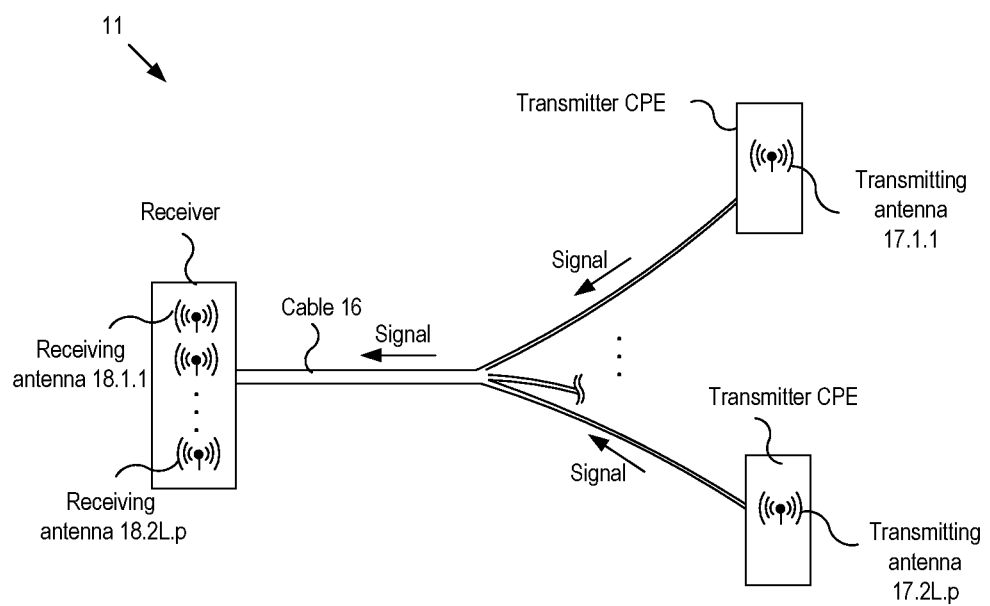
FIG. 2 shows a schematic diagram of an upstream network environment according to embodiments of the present disclosure.

FIG. 2 shows a schematic diagram of an upstream network environment 11 according to embodiments of the present invention. As depicted, the transmitter CPEs may send signals using their antennas 17.1.1-17.2L.p to the receiver having antennas 18.1.1.-18.2L.p via the cable 16. In embodiments, the antennas in the transmitter 12 in FIG. 1 may be used as the receiving antennas in FIG. 2 and the antennas in the CPEs in FIG. 1 may be used as transmission antennas in FIG. 2.

Figure 3A:
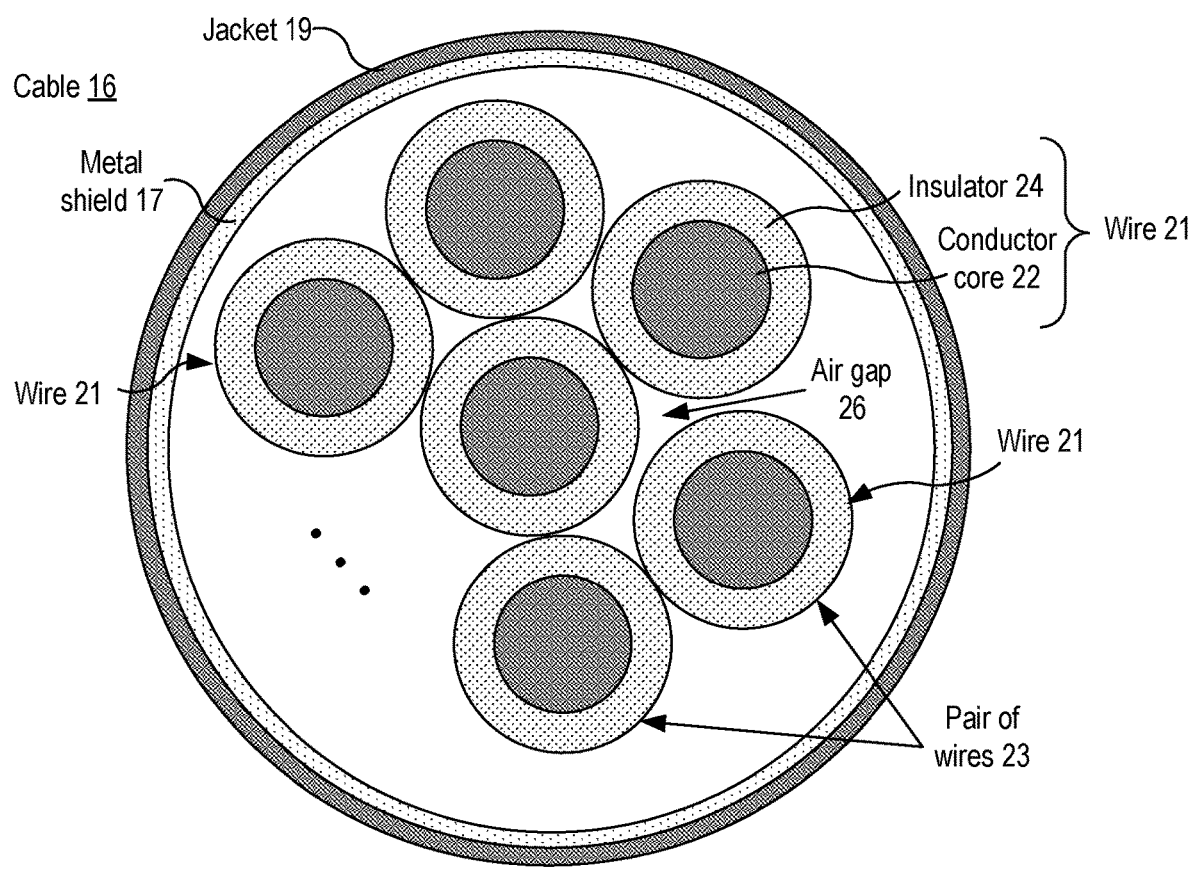
FIG. 3A shows a cross sectional view of the cable in FIG. 1, taken along the direction 3-3.

FIG. 3A shows a cross sectional view of the cable 16 in FIG. 1, taken along the direction 3-3. As depicted in FIG. 3A, the cable 16 may be covered with a metal shield 17 and a PVC (polyvinyl chloride) jacket 19 and include multiple wires 21, where each pair (or quad) of wires 23 may be twisted/curved and extend from the transmitter 12 to a corresponding receiver. For the purpose of illustration, it is assumed that each receiver is using only one pair of wires. However, it should be apparent to those of ordinary skill in the art that each receiver may use more than one pair of wires, particularly in situations where there is more than one pair of drop wires to a residence (user premise).

Each wire 21 may include a conductor core 22 covered with an insulator 24, where the insulator 24 may be formed of plastic, paper or rubber-like polymers. The air gap 26 may represent a non-conductive space between wires. It should be apparent to those of ordinary skill in the art that the cable 16 may include a suitable number of wires. In embodiments, a pair of wires (equivalently "wire pair" or "twisted pair") runs to each user premise.

Figure 3B:
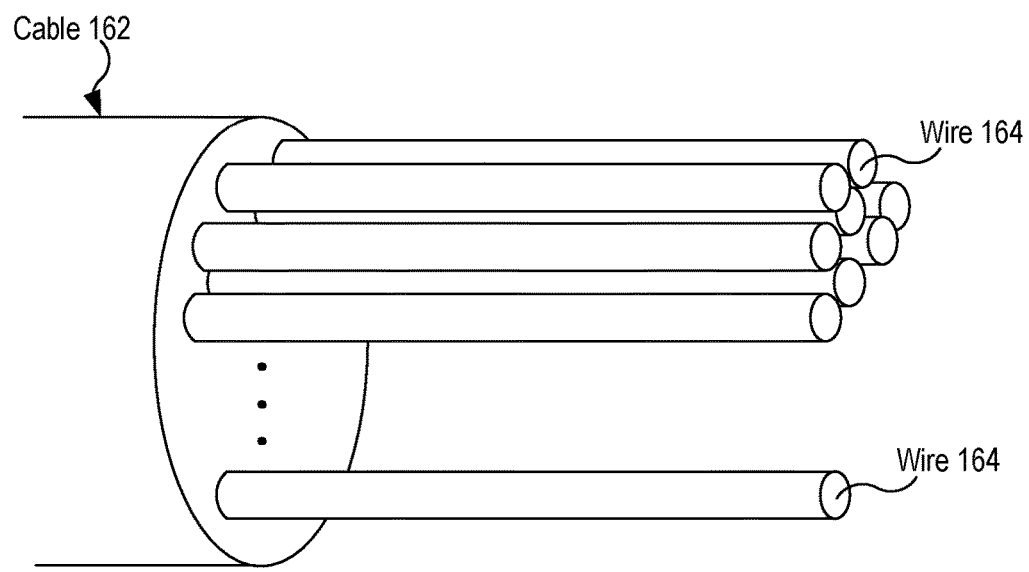
FIG. 3B shows a partial cut away view of a cable according to embodiments of the present disclosure.
Figure 3C:
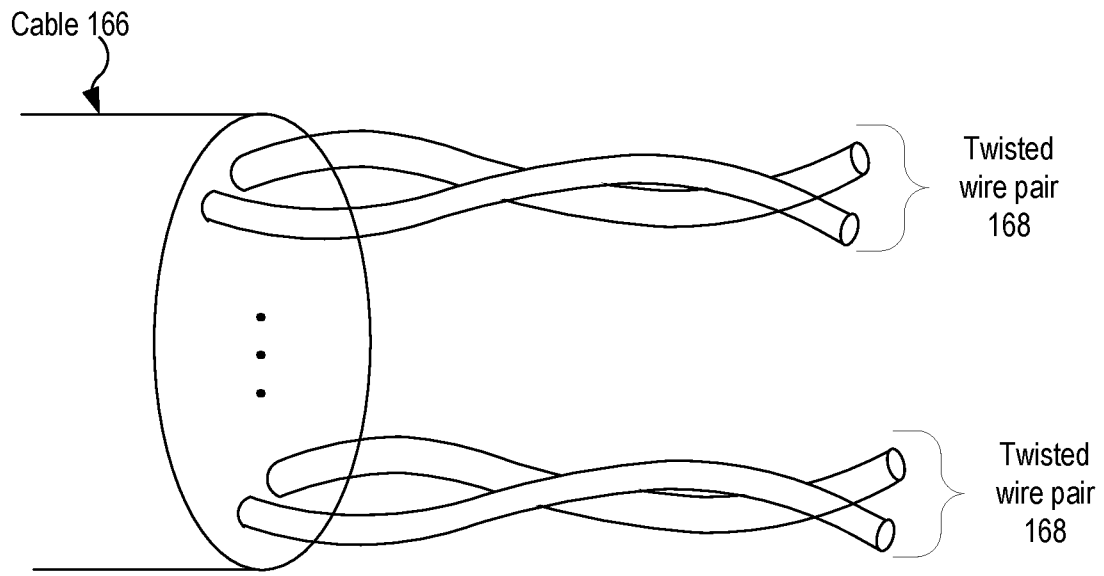
FIG. 3C shows a partial cut away view of a cable according to embodiments of the present disclosure.

FIG. 3B shows a partial cut away view of a cable 162 according to embodiments of the present disclosure. As depicted, the cable 162 may include multiple wires 164, where the wires 164 are not twisted. FIG. 3C shows a partial cut-away view of a cable 166 according to embodiments of the present disclosure. As depicted, the cable 166 may include a number of twisted pairs 168, where each twisted pair may run to each user premise. It is possible to have groups of 4 wires (quads) twisted together and to have different twist rates on different pairs or quads.

Figure 4:
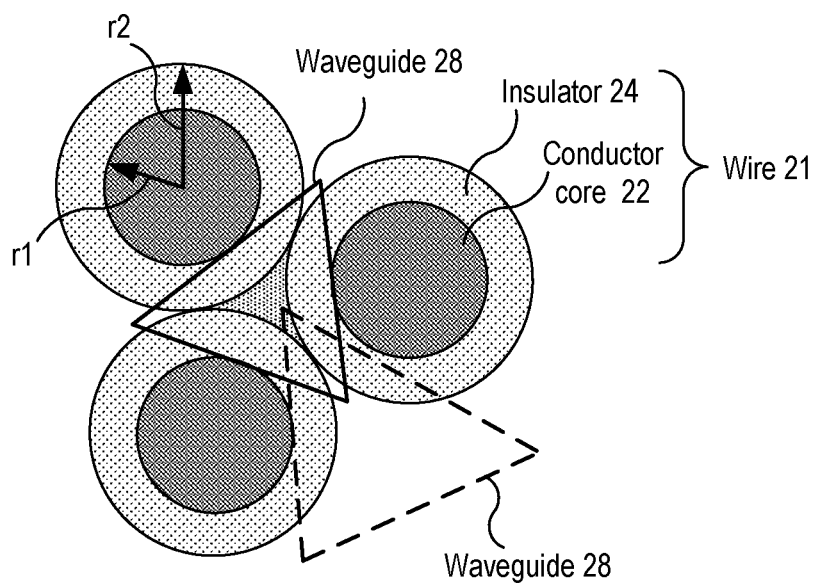
FIG. 4 shows an enlarged view of a portion of the cable in FIG. 3, illustrating waveguides in the cable.

FIG. 4 shows an enlarged view of a portion of the cable in FIG. 3. In embodiments, the air gap 26 and insulator 24 may form a waveguide 28 for waveguide-mode transmission waves, i.e., the conductor cores 22 may define a waveguide 28 through which the waveguide-mode signals propagate along the longitudinal direction of the cable 16. In embodiments, the cable 16 may include a large number of waveguides 28 that are somewhat parallel but may intersect each other in many places.

In embodiments, the air gap 26 in each waveguide 28 may twist around as the waveguide modes propagate along the cable 16 and thus may not be triangularly shaped. In embodiments, a pair of wires may have different twist rates per unit length than other pairs of wires. The air gaps 26 may undergo geometric transformations as they take different shapes in each cross section of the cable, and the positions of the wires 21 may change with respect to one another. It is also noted that the wires 21 do not need to be paired and twisted as long as the wires 21 are in close proximity to each other so that the copper cores 22 can guide the waveguide modes as they propagate along the cable 16.

In embodiments, the cable 16 may have multiple bending portions along its longitudinal direction. Some waveguide modes that travel through each waveguide 28 may "veer" from the waveguide at each twisted/bending portion. However, in embodiments, the presence of a large number of conductor cores 22 (and waveguides 28) may allow the crosstalk (veering electromagnetic waves) to be captured and recombined. Stated differently, the cable 16 may form an equivalent of a rich-scattering cross-talking system between the different users' waveguide mode transmissions as well as between those modes for the same user. In embodiments, the metal shield 17 may facilitate the capturing and recombining of any veering waves because waves are reflected by the metal shield and returned to the other conductors as they propagate parallel to the length of the cable, instead of escaping the cable, which escape would otherwise cause a loss of energy. In embodiments, the reflected waves form a TIR mode, which is similar to the TIR modes in fiber cables. In embodiments, as depicted in FIG. 4, the air gap may have an air path from any one air gap point to any other air gap point as the wires twist in pairs together, but almost randomly with respect to other pairs.

The waveguide-mode transmissions are unlike conventional DSL transmission which transmits data in the TEM mode through the pairs of wires 21 in cable 16 and requires a loop current and a termination resistance between the wires. In embodiments, data may be transmitted in the waveguide modes along the waveguides 28. The waveguide modes propagate above a cut-off frequency, which is roughly about 100 GHz and probably below 2 THz for most cables of twisted pairs when viewed as multi-element waveguides. In embodiments, each pair has two wires, and each of those wires may support one or more waveguide modes of transmission or polarization, e.g., plasmonic TEM and TM modes. A number p of transmission modes may be used simultaneously for each of L pairs (2L wires), approximately increasing the transmission speeds by p times compared to the transmission speed using a single mode. In embodiments, TIR, TE2, and TM2 modes of transmission along the waveguides 28 may be also supported, increasing the value of p.

In embodiments, the present disclosure may include a combination of the waveguide modes for each of the curved wires and vectored signal processing to exploit various combinations of these waveguide modes, such as TM, plasmonic TEM, TIR, TM2, and so forth for each, any, and/or some/all of the users/wires. In embodiments, bandwidths that support sufficient signal strength may be found to be at frequencies in the few hundred GHz range for typical phone wires. In embodiments, the radius "r1" (shown in FIG. 4) of the conductor core 22 is typically 0.2-0.3 mm. In embodiments, the radius "r2" (shown in FIG. 4) of the insulator 24 is slightly larger.

Figure 5:
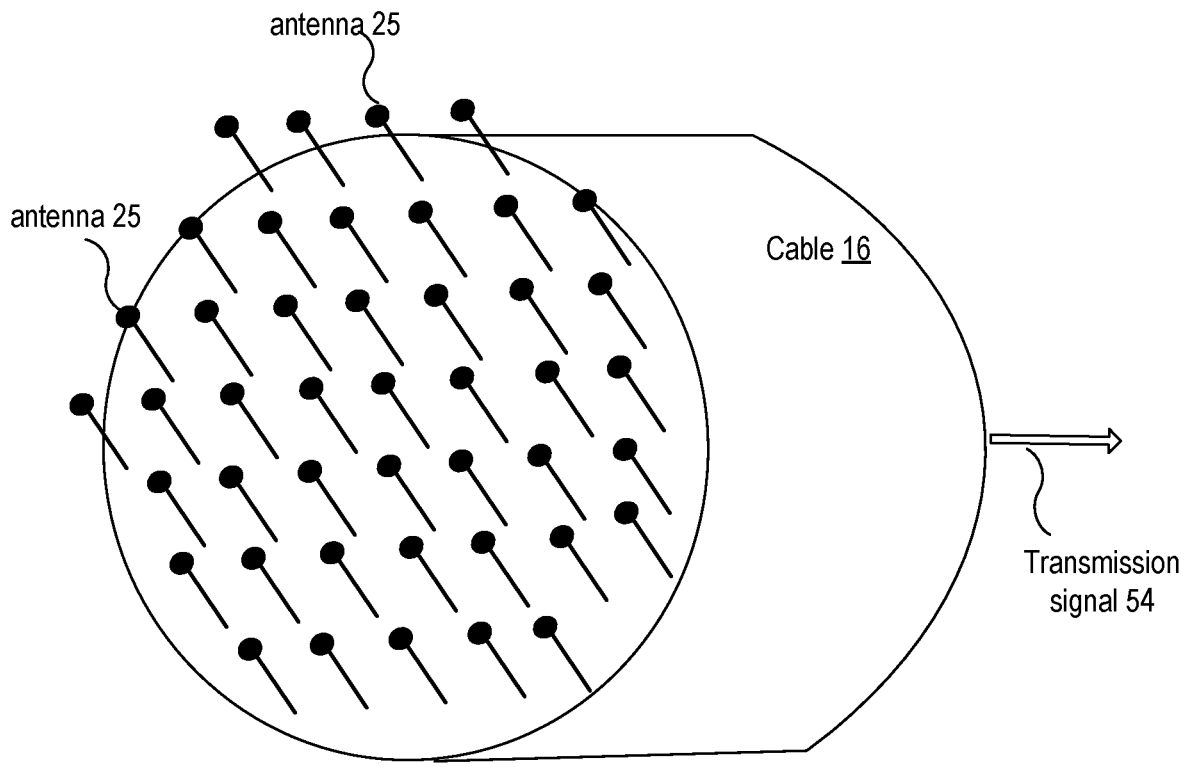
FIG. 5 shows a plurality of antennas in the transmitter according to embodiments of the present disclosure.

FIG. 5 shows a plurality of antennas 25 in the transmitter 12 according to embodiments of the present disclosure. FIG.

6A shows various types of antennas that could couple signals to a wire according to embodiments of the present disclosure. FIG. 6B shows a cross sectional view of an antenna, taken along the direction 6B-6B according to embodiments of the present disclosure. FIG. 6C shows a cross sectional view of an antenna, taken along the direction 6C-6C according to embodiments of the present disclosure. In embodiments, each of the antennas 38a-38d may be dipoles; they may be formed of electrically conducting metal and may be used as a transmission antenna and/or receiving antenna. Often this may be made of two parallel wires across which an electromagnetic field is induced. In this two-parallel-wire embodiment, each of the antennas 38a-38d may be coupled photoconductively, which associates the waveguide-mode transmissions to the conductor(s) by generating the electromagnetic waves from near-infrared laser data-modulated signals that impinge on these parallel wires. The efficiency of coupling from the signal source to the wire can be improved by aligning the polarization of the electromagnetic wave to the waveguide mode. For example, a TM mode can be efficiently excited by radially polarized electromagnetic waves; thus, the antenna structure may include a polarizer that converts the polarization of the source electro-magnetic wave to another polarization such as radial polarization. At (near-) THz frequencies, electromagnetic waves behave like light. The efficiency of coupling from the signal source to the wire can be improved by using a lens that focuses the electromagnetic wave to a desirable location in the waveguide. For example, a TM mode can be efficiently excited by focusing the electromagnetic wave on the surface of wire.

Figure 6A:
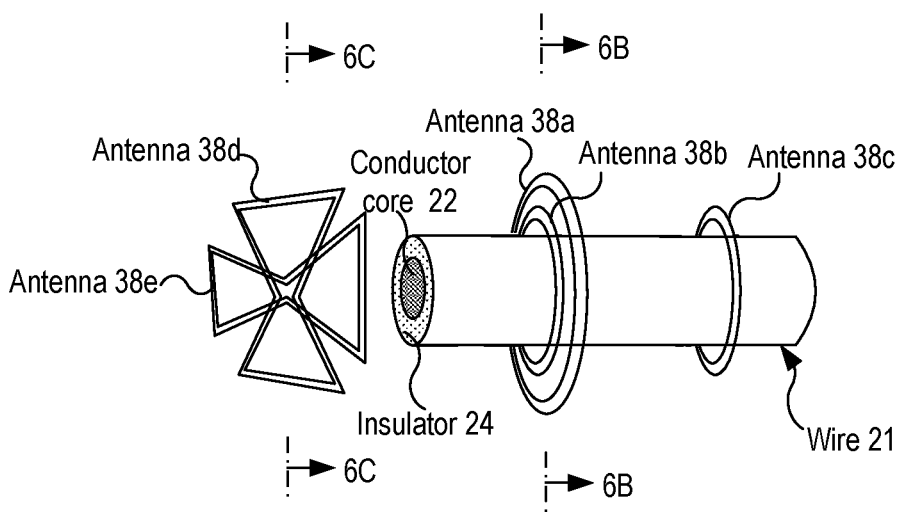
FIG. 6A shows various types of antennas mounted on a wire according to embodiments of the present disclosure.
Figure 6B:
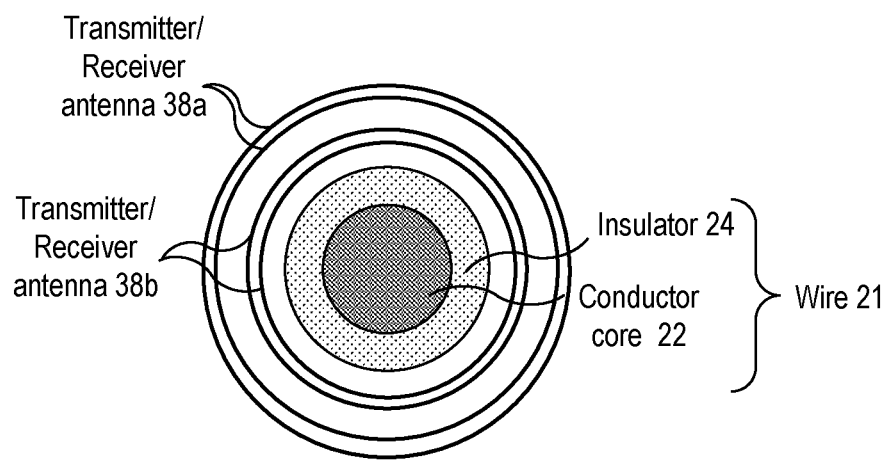
FIG. 6B shows a cross sectional view of an antenna, taken along the direction 6B-6B according to embodiments of the present disclosure.
Figure 6C:
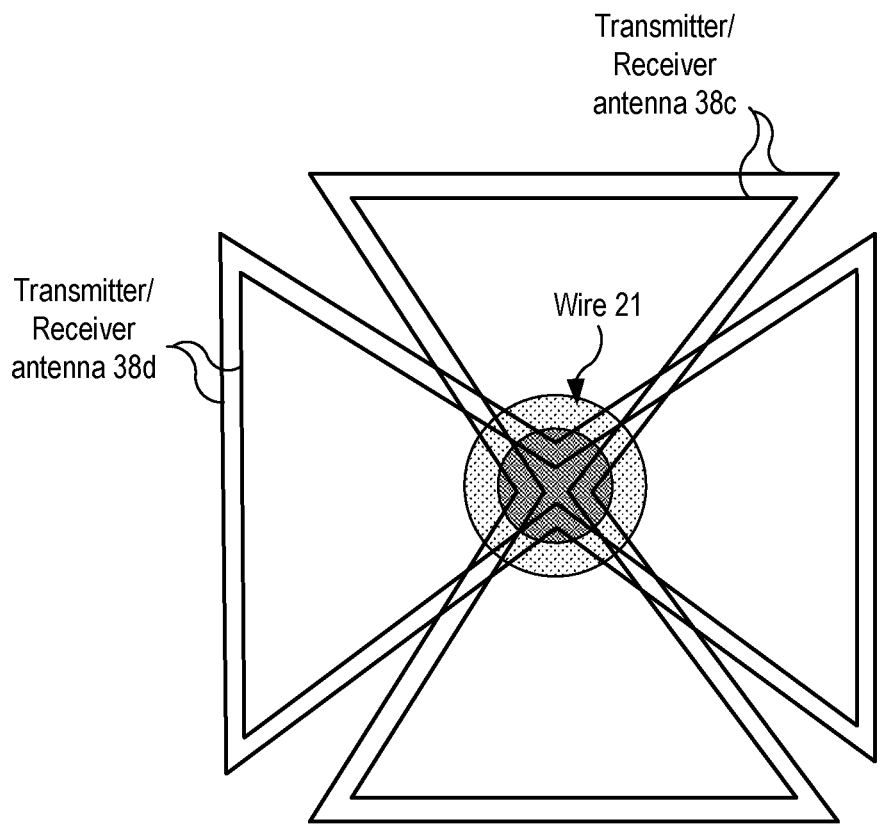
FIG. 6C shows a cross sectional view of an antenna, taken along the direction 6C-6C according to embodiments of the present disclosure.

As depicted in FIG. 6A, one or more antennas 38a-38e, which may correspond to antennas 25 in FIG. 5, may be mounted on the wire 21, where each of the antennas 38a-38e may be used to transmit and/or receive a waveguide-mode signal. The location of antennas on the wire in FIG. 6A is chosen just for illustration. The distance between antennas can be different from what is shown in FIG. 6A. Usually, the antenna is placed near the end of cable. Also, depending on the type of transmission mode, the shape and dimensions of each antenna may be determined. For instance, the antennas 38a-38c may have a ring shape (or a donut shape), while the outer diameter of the antennas 38a-38c may vary according to the type of transmission mode. In another example, the antennas 38d and 38e may have a "bow tie" shape. One skilled in the art will recognize that the antenna shape may be modified in accordance with various embodiments and that those illustrated in FIG. 6A are examples only. Additionally, one skilled in the art will recognize that an antenna may be located at various locations relative to a wire such as an antenna being positioned around a wire and physically contacting a dielectric, an antenna being positioned around but not physically touching a wire or dielectric, an antenna being positioned off an edge of a wire or any other location that allows a signal to be detected by the antenna itself. In certain embodiments, a dielectric may be removed from a wire to allow an antenna to be positioned to transmit or detect a signal in accordance with certain implementations described above.

FIG. 6B shows three photoconductive antennas 38a-38c according to embodiments of the present disclosure. As depicted, each antenna may include two concentric non-touching wires and send a waveguide-mode signal. In embodiments, the two concentric non-touching wires are approximately parallel to each other. In embodiments, more than two circular non-touching photoconductive antennas may be disposed in the concentric manner around the wire 21.

FIG. 6C shows two photoconductive antennas 38d and 38e according to embodiments of the present disclosure. As depicted, each of the antennas 38d and 38e may include two non-touching wires and the two non-touching wires may be approximately parallel to each other. In embodiments, each antenna may have a bow-tie shape and be located away from the distal end of the wire 21.

As discussed above, in embodiments, each antenna 25 may transmit a signal in one waveguide mode, such as TE, TM, plasmonic TEM, TE2 or TM2 mode, along a corresponding waveguide 28. As such, each wire 21 may be used to transmit a first waveguide-mode signal in TM mode on a first carrier frequency and a second waveguide-mode signal in plasmonic TEM on a second carrier frequency, where the first carrier frequency may be the same as or different from the second carrier frequency. In embodiments, the amplitude and phase of the waveguide mode signal from each antenna 25 may be controlled by a precoder of the transmitter 12, i.e., the precoder may perform vectored signal processing to coordinate the signals that enter the waveguide(s) in different waveguide modes such that the corresponding signals that exit at each receiver are amenable for detection, for example by adjusting the signal power and/or by aligning phases of signals received from different waveguide modes, and/or by eliminating the signals that were sent using different transmission modes that are not intended to be received by the receiver. In embodiments, for instance, the precoder may control the phases and amplitudes of the waveguide-mode transmitted signals so that the waveguide modes associated with each wire or waveguide 28 experience constructive interference at a particular angle while the waveguide-mode signals experience destructive interference at other angles.

Figure 7A:
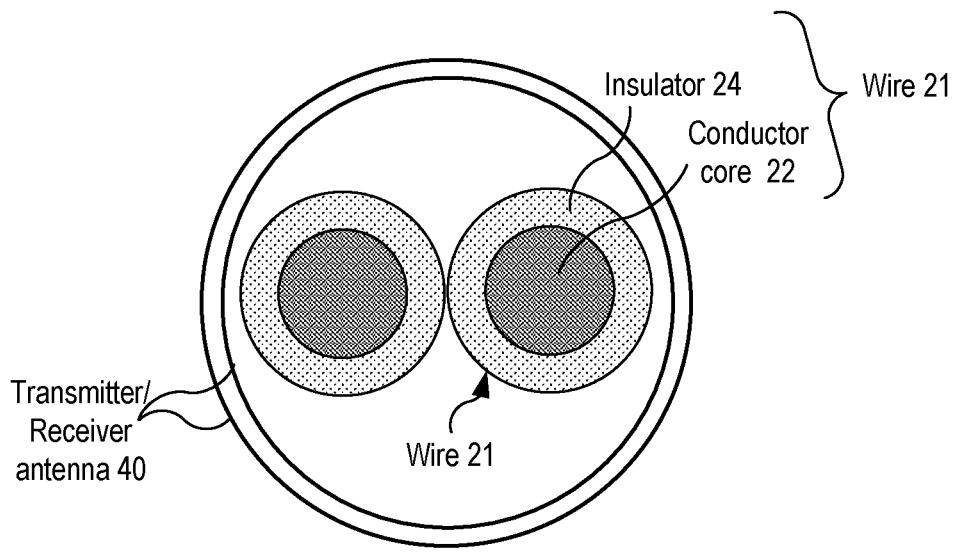
FIG. 7A shows a structure of antennas on a wire pair, taken along the direction 7-7 in FIG. 1 according to embodiments of the present disclosure.

FIG. 7A shows a structure of antennas, taken along the direction 7-7 in FIG. 1, according to embodiments of the present disclosure. For the purpose of illustration, it is assumed that each of the receivers 14.1.1-14.2L.p may use a twisted pair of wires, even though other suitable number of wire pairs may be used by each receiver. As depicted, the antenna 40 may surround a pair of wires 21 to receive the waveguide-mode signals guided by the pair of wires and include two non-touching circular wires.

In embodiments, waveguides can be formed by each wire as well as by interstices between wires. Each such waveguide may support multiple transmission modes. Transmission modes may include TM1,0 and plasmonic TEM, and also possibly additional modes such as other TM modes including TM2 modes, TIR modes, and TE modes.

Figure 7B:
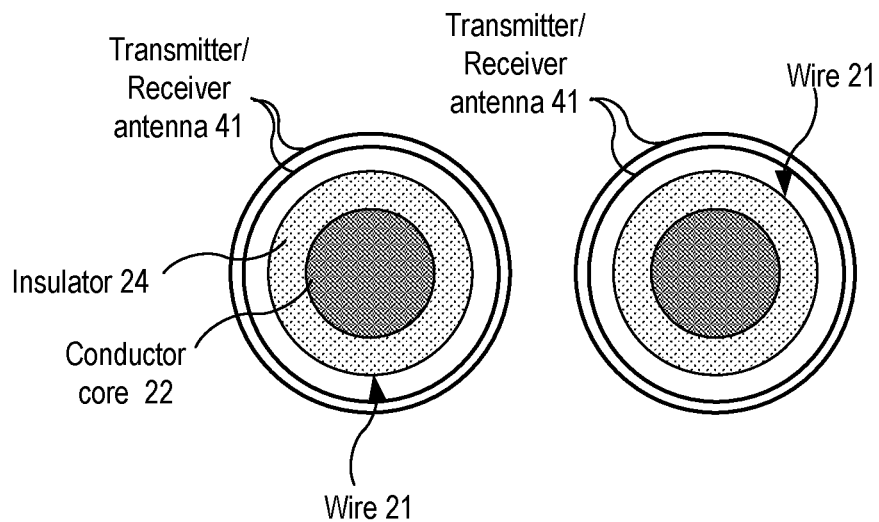
FIG. 7B shows a structure of antennas on a wire pair, taken along the direction 7-7 in FIG. 1 according to embodiments of the present disclosure.
Figure 7C:
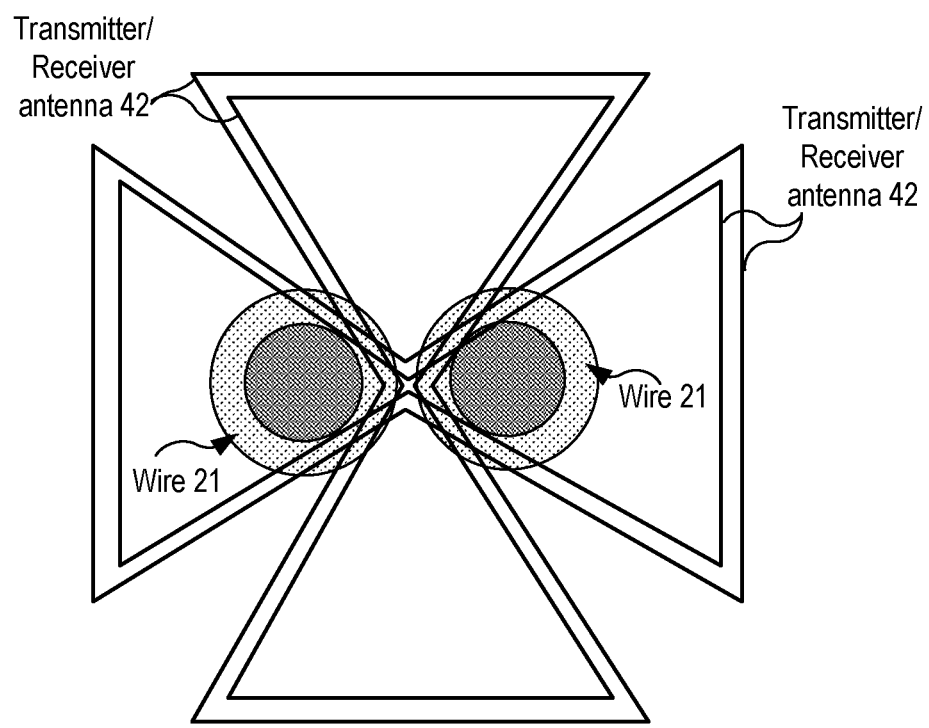
FIG. 7C shows a structure of antennas on a wire pair, taken along the direction 7-7 in FIG. 1 according to embodiments of the present disclosure.

FIG. 7B shows a structure of antennas on a wire pair, taken along the direction 7-7 in FIG. 1 according to embodiments of the present disclosure. As depicted, two separate antennas 41 may be mounted on each wire 21. In embodiments, each of the two antennas 41 may include two non-touching circular wires. FIG. 7C shows a structure of antennas on a wire pair, taken along the direction 7-7 in FIG. 1 according to embodiments of the present disclosure. As depicted, each of the antennas 42 may have a bow tie shape and include two non-touching wires that may be approximately parallel to each other. In embodiments, the antennas 42 may be disposed away from the distal end of the wires 21.

In FIGS. 6A-7C, each antenna receives waveguide-mode signals guided by one or two wires. However, it should be apparent to those of ordinary skill in the art that each antenna may surround other suitable number of wires to capture the waveguide-mode signals. Moreover, it should be apparent to those of ordinary skill in the art that each antenna needs to be connected to a load that converts electromagnetic wave to electrical signals such as voltage or current. For example, the electromagnetic wave at (near-) THz frequencies may be converted to electrical signals by exposing the electromagnetic waves to a photodetector.

In embodiments, the downstream transmission, which refers to information that flows from the transmitter 12 to the receivers 14.1.1-14.2L.p, may use a vector broadcast channel, while the upstream transmission, which refers to information that flows from the transmitters that are collocated with the receivers 14.1.1-14.2L.p to the receiver that is collocated with the transmitter 12, may use a vector multiple-access channel. In embodiments, a specific transmission processing method, known as "Generalized Decision Feedback Equalizer (GDFE)" may be implemented on each tone or subcarrier of a discrete multitone (DMT) transmission system independently if all transmission systems in the cable 16 use a common symbol-rate clock with appropriate cyclic extensions or the equivalent as is well known in the art. The GDFE can greatly reduce complexity compared to simply transmitting across a wideband channel. In embodiments, the downstream system may use a nonlinear (or dirty paper) precoder along with a linear pre-processing matrix, while the upstream systems may use a generalized decision feedback (successive decoding) approach independently on each tone, with overall bit assignments for each user and each tone determined by well-known methods.

In embodiments, the system 10 of FIG. 1 may estimate the overall channel response for each combination of transmitter and receiver, instead of the individual interference response at each segment that causes interference, such as splice, bending, proximity of two conductors, and so forth. It may be quite difficult to estimate the individual interference response because there are so many segments that cause interference along the cable 16. In embodiments, the path of energy flow from the transmitter to receiver may resemble a swiss cheese with many randomly located holes inside. As it may be impractical to estimate the location of the holes in the Swiss cheese, it is impractical to estimate the interference coupling at each coupling points. In embodiments, based on the estimated channel, the GDFE can find the best transmission configuration that passes energy most efficiently. Since the channel response can be different for different cables or for different uses, in embodiments, adaptive learning may be used to estimate the channel.

In embodiments, other transmission processing methods may be employed for the transmission system 10, including linear precoding and Multi-input-multi-output (MIMO) processing. In embodiments, alternatives to DMT that also divide up a single wideband channel into multiple parallel sub-carriers may also be used, where the alternatives may include orthogonal frequency division multiplexing (OFDM), filter banks, code division multiple access (CDMA), separate analog channels, and wavelets. In embodiments, all transmitter and receiver processing described here may be performed separately on each subcarrier. In embodiments, alternatives to DMT include an ultra-wideband (UWB) scheme that uses pulses containing a signal with broad frequency spectrum.

Figure 8A:
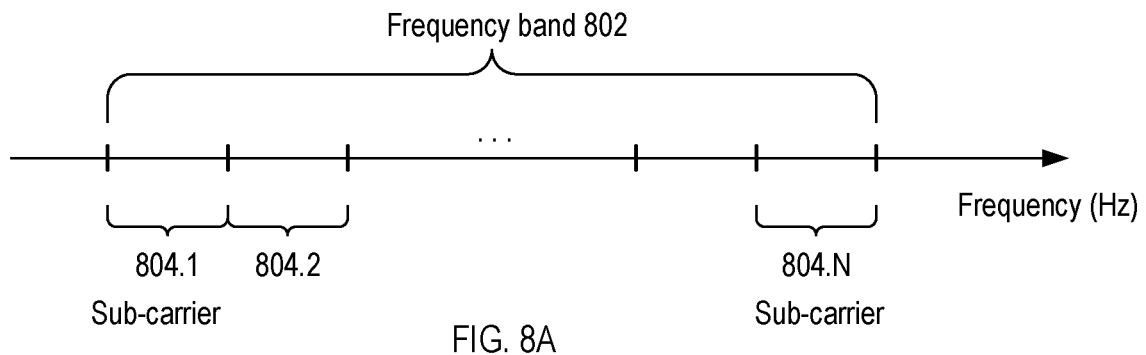
FIG. 8A shows a schematic diagram of sub-carrier frequencies according to embodiments of the present disclosure.

In embodiments, the performance of the system 10 may be a function of carrier frequency. To determine a preferred carrier frequency for each data mode, the frequency band may be divided into multiple sub-carrier frequencies and the transmission rate of each mode may be measured at each sub-carrier frequency. FIG. 8A shows a schematic diagram of sub-carrier frequencies 804.1-804.N (or, sub-carriers for short) according to embodiments of the present disclosure. As depicted, the frequency band 802 may be divided into multiple sub-carrier frequencies.

Figure 8B:
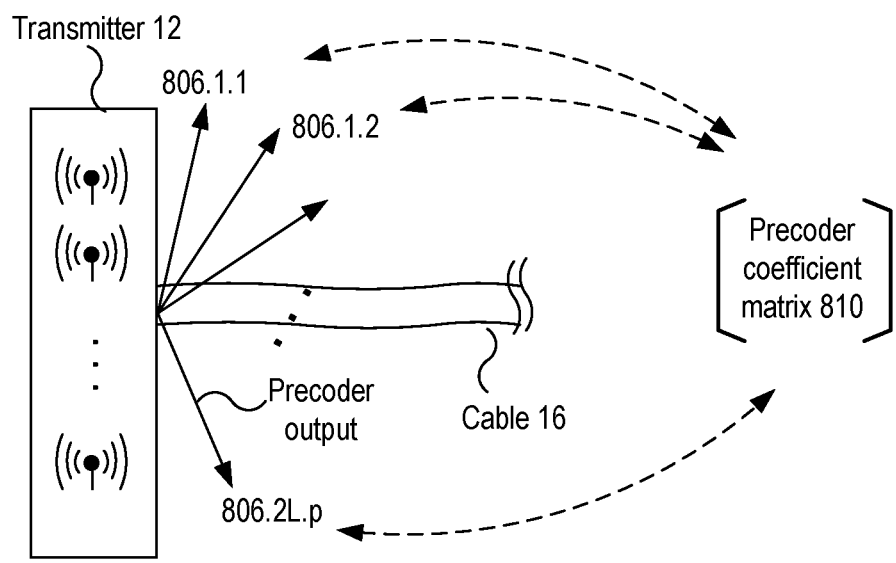
FIG. 8B shows multiple precoded waveguide-mode signals that enter a cable at a sub-carrier frequency according to embodiments of the present disclosure.

FIG. 8B shows the "beam patterns" of precoded waveguide-mode signals that enter the cable 16 at one of the sub-carrier frequencies 804.1-804.N according to embodiments of the present disclosure. As depicted, the prefilter of the transmitter 12 may control the amplitudes and phases of the transmitted waveguide modes before they pass through the modulators and to the antennas 25, where each of the arrows 806.1.1-806.2L.p represents a waveguide-mode resultant spatial path for data transmission corresponding to one of the users 14. There may optionally be a (nonlinear) precoder prior to the prefilter that helps pre-subtract interference that would have been present in the spatial path from any other user's data that is not intended for the particular customer's premise. In embodiments, each of the receivers 14.1.1-14.2L.p may use one pair of wires for communication with the transmitter 12, with up to 2p waveguide-transmission modes per each of the L pairs, thereby using p data modes, i.e., a total of 2Lp modes may be used to transmit data to the receivers 14.1.1-14.2L.p. The precoder of the transmitter 12 may multiply the input data vector by a 2Lp×2Lp matrix on each tone. This matrix is called the precoder coefficient matrix (or, coefficient matrix for short) 810, where each element of the coefficient matrix 810 is a complex gain of amplitude and phase for a waveguide-mode signal on the corresponding sub-carrier.

In embodiments, the signals may be transmitted or received using twisted pairs that are not connected to any receivers, in particular when the interference between the unused twisted pair and active twisted pairs is strong. Using the unused lines, the dimension of the precoder matrix is increased to facilitate the design of an optimal precoder matrix.

In embodiments, to identify the preferred sub-carrier frequency for each mode, the transmitter 12 may perform an initialization process. During the initialization process, the transmitter 12 may apply the coefficient matrix 810 to the antennas 25 to send probing sequences (or, defined bit sequence), covering all candidate sub-carrier frequencies 804.1-804.N on each mode. Then, the transmitter 12 may receive the mode's channel-response feedback from the receivers 14.1.1-14.2L.p. Based on the received channel-response feedback, the channel response of all channels and the crosstalk response between all modes for all users may be estimated. Then, based on the estimated channel and crosstalk responses, the preferred sub-carrier frequency and, possibly, a transmit power-spectral-density (PSD) may be identified. Upon completing the initialization process, the transmitter 12 may begin communicating data with the receivers 14.1.1-14.2L.p (and vice versa).

Figure 9A:
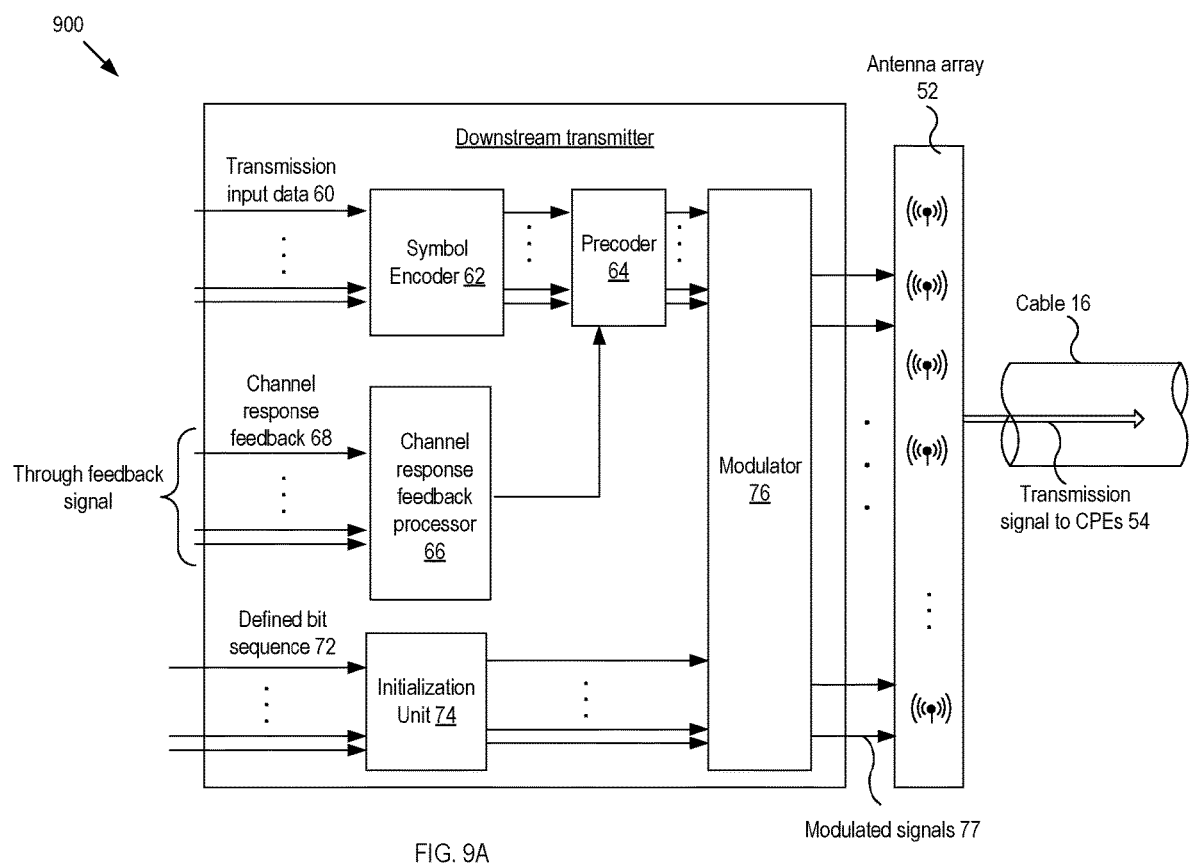
FIG. 9A shows a functional diagram of a downstream transmitter according to embodiments of the present disclosure.

FIG. 9A shows a functional block diagram 900 of the downstream transmitter 12 according to embodiments of the present disclosure. In embodiments, the receivers 14.1.1-14.2L.p may be configured to process data in different transmission modes. In embodiments, the channel-response transmission matrix may have the main channel responses on its diagonal elements, with crosstalk channel responses on the off-diagonal elements. In embodiments, the channel response transmission matrix (or, transmission matrix for short) for the set of all transmission modes used by the receivers 14.1.1-14.2L.p may be learned adaptively by a suitable training/initialization method that employs the defined modulated bit sequence (probing sequence) 72. In embodiments, the transmission matrix may be determined based on the estimated channel response of all channels and the crosstalk responses between all pairs of channels during the initialization process. In embodiments, the transmission matrix may also be calculated using data-directed feedback, and may account for noise statistics. The defined bit sequence 72 may include reference data having a sequence known to both the transmitter 12 and receivers 14.1.1-14.2L.p.

In conventional DSL systems, the wire pair connecting the two transceivers on either side of the system is guaranteed to be the main communication channel between these two transceivers. The crosstalk channels induced by other wires surrounding the main wire pair will always be significantly weaker than the main channel. This allows conventional DSL systems to use training/initialization processes that utilize the main channel to efficiently learn the characteristics of the main channel and of the crosstalk channels.

In the waveguide-based approach to wireline communications disclosed here, there are no guarantees that the waveguides adjacent to the main wire pair will correspond to the main channel between the two transceivers. The "Swiss cheese" waveguide described here will typically result in a very complex pattern of guided and reflected waves that may result in a very different transmission channel matrix that is not diagonally dominant. Therefore, conventional initialization processes may not be effective in this approach.

One embodiment of the invention disclosed herein uses an additional phase in the initialization process that utilizes the reciprocity of the linear transmission medium to generate a first approximation of the channel matrix. In this additional initialization phase, the transceiver equipment located at the customer premises transmits known symbol sequences at different frequencies. The signals received at the other end provide a good first estimate of the main channel that corresponds to that particular customer location. By sweeping both the upstream and downstream frequencies, this process may generate a good first estimate of the corresponding channel matrix entries for both the upstream and downstream channels, namely of the corresponding column of the upstream channel and the corresponding row of the downstream channel matrix. Repeating this process for each of the customer premises will yield a good first estimate of the entire upstream and downstream channel matrices. This estimate may then be used in more traditional initialization methods to more efficiently generate accurate estimates of the upstream and downstream channel matrices.

In embodiments, the initialization unit 74 may perform the initialization process using the defined bit sequence 72 to determine the transmission matrix, where each element of the transmission matrix represents the status of a mode's channel between a transmission antenna 13 and one of the receiver antennas 15.1.1-15.2L.p, i.e., each element of the transmission matrix acts as some factors distorting/deteriorating the signal transmitted through a corresponding channel.

In embodiments, the channel response feedback processor 66 may process the received channel response feedback 68 through a feedback signal to estimate the channel response of all channels and the crosstalk response between all pairs of channels. Then, based on the estimated channel and crosstalk responses, the channel response feedback processor 66 may determine the transmission matrix. In embodiments, the precoder 64 may determine the precoder coefficient matrix 810 that controls the amplitudes and phases of waveguide-mode signals to be transmitted on the channels for all active sub-carrier frequencies. The channel response feedback processor 66 may also be involved with determining precoder coefficients. In embodiments, the channel response feedback processor 66 and the precoder 64 may identify the preferred sub-carrier frequency for each channel and, possibly, a transmit power-spectral-density (PSD) for each channel. The precoder 64 may be structured as a linear precoder, zero-forcing precoder, minimum mean squared error (MMSE) precoder, non-linear precoder, GDFE or other structure used to decrease crosstalk at receivers from a multi-output transmitter. In embodiments, the precoder 64 may include a non-linear processor and a linear processor. In embodiments, all of the output signals from the precoder 64 may be synchronized in time.

In embodiments, to transmit the transmission input data 60 to the receivers 14.1.1-14.2L.p, the input data may be encoded by the symbol encoder 62. In embodiments, the symbol encoder 62 may use various types of modulation technique, such as Quadrature Amplitude and phase modulation (QAM) and Quadrature phaseshift keying (QPSK), to modulate the transmission input data 60. Also, in embodiments, the symbol encoder 62 may perform pre-compensation on the transmission data 60 so that the distortion and attenuation of the transmission signal 54 during its travel along the cable 16 may be compensated. Then, for each channel, the precoder 64 may select a preferred sub-carrier frequency and the coefficient matrix 810 and process the encoded input data according to the coefficient matrix. The antenna array 52, which may correspond to the antennas 25, may transmit the processed data to the receivers 14.1.1-14.2L.p through the cable 16.

In embodiments, the transmitter 12 may include other components, such as digital-to-analog converter to convert the digital data into analog signals, and transmit filtering. Also, the precoder 64 may perform other functions, such as precoder ordering.

Figure 9B:
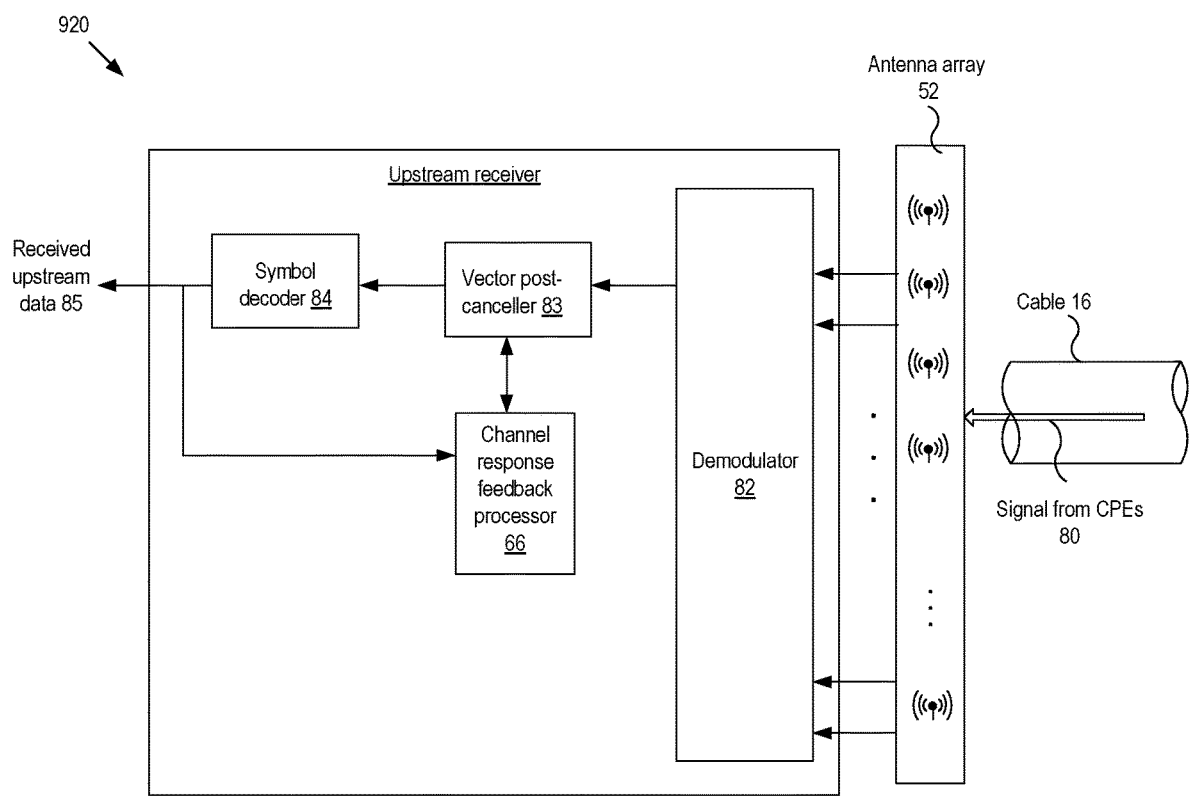
FIG. 9B shows a functional block diagram of an upstream receiver according to embodiments of the present disclosure.

FIG. 9B shows a functional block diagram 920 of an upstream receiver according to embodiments of the present disclosure. In embodiments, the upstream receiver 920 may be included adjacent to the transmitter 12. As depicted, the signal from CPEs (receivers) 14.1.1-14.2L.p may be transmitted via the cable 16 and received by the antenna array 52. In embodiments, one or more demodulators 82 may decode the received upstream DMT symbols. The vector post-canceller 83 may remove crosstalk between channels.

In embodiments, the symbol decoder 84 may accept the output signal from the vector post-canceller 83 and estimate the received symbols, which are then output as received upstream data 85. During training phases or during reception of training symbols, the output 85 of the symbol decoder 84 may be fed-back to the channel response feedback processor 66 that estimates the channel and crosstalk responses. Some of the received upstream data 85 may carry estimates of the downstream channel and crosstalk responses, or downstream received error signals, which correspond to channel response feedback and are input to the downstream channel response feedback processor 66. Both downstream and upstream directions may also carry in overhead signals the numbers of bits and gains that are transmitted for each mode/user on each sub-carrier as is typically done in DMT/multicarrier transmission systems (often called "bit swapping").

Figure 10:
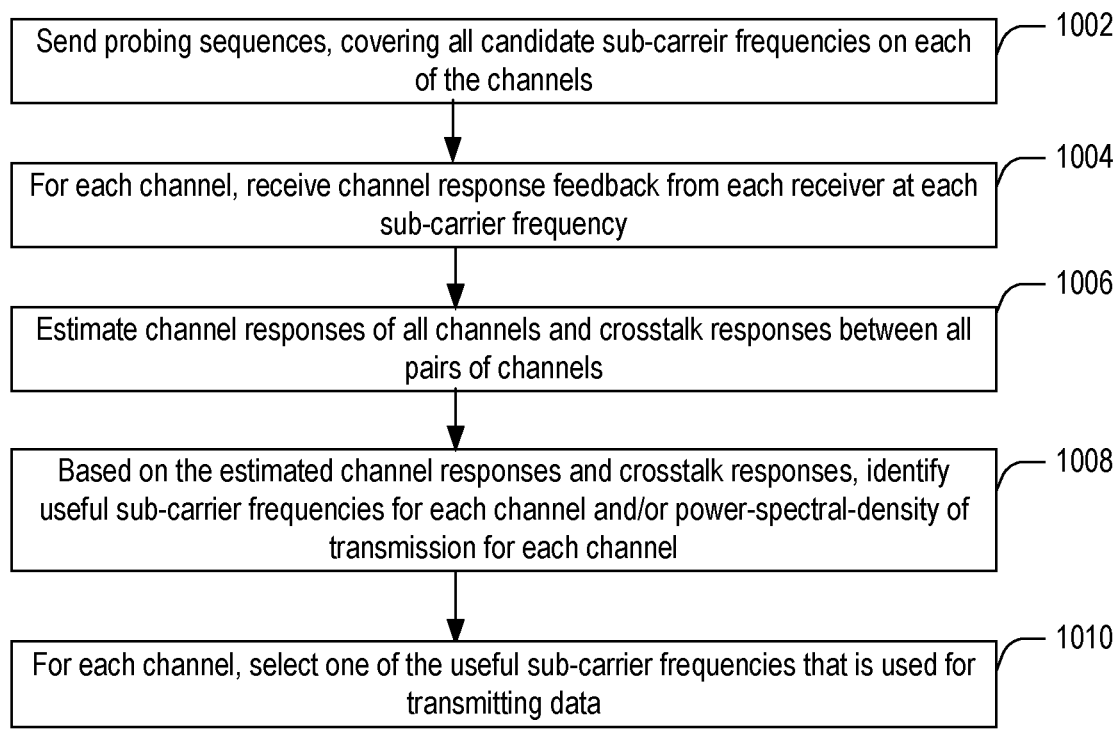
FIG. 10 shows a flowchart of an illustrative process for initializing a communication system according to embodiments of the present disclosure.

FIG. 10 shows a flow chart 1000 of an illustrative process for initializing a communication system according to embodiments of the present disclosure. In embodiments, the initialization process may be performed on a regular basis or each time when there is a change to the system 10. The process 1000 starts at step 1002. At 1002, the transmitter 12 may send a probing sequence (or, define bit sequence) 72 to the receivers 14.1.1-14.2L.p, covering all candidate sub-carrier frequencies 804.1-804.N on each of the channels. In embodiments, each wire in the cable 16 may provide two or more modes for transmitting waveguide-mode signals.

At 1004, for each channel, the transmitter 12 may receive channel response feedback from each receiver at each sub-carrier frequency. At step 1006, based on the received channel response feedback, channel responses of all channels and crosstalk responses between all pairs of channels may be estimated. Then, at step 1008, based on the estimated channel responses and crosstalk responses, useful sub-carrier frequencies for each channel may be identified. Also, preferred sub-carrier frequencies and a preferred power-spectral-density (PSD) may be determined for each channel (1008). At step 1010, for each channel, one of the useful sub-carrier frequencies that is to be used for transmitting data may be selected. These sets of frequencies may overlap.

Figure 11:
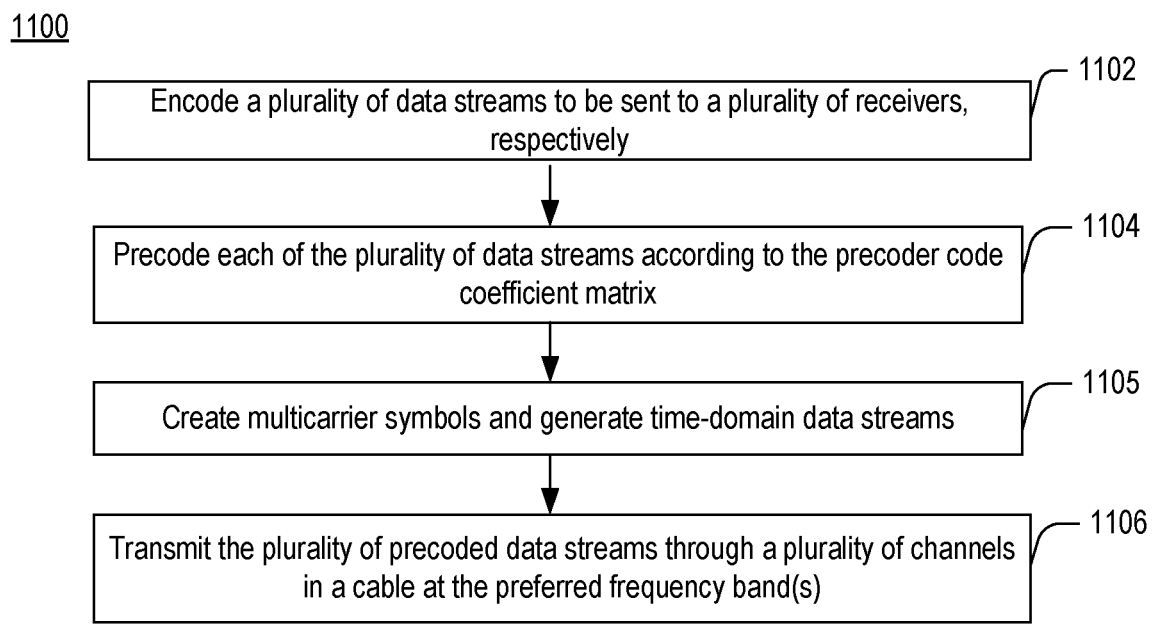
FIG. 11 shows a flowchart of an illustrative process for transmitting data according to embodiments of the present disclosure.

FIG. 11 shows a flowchart of an illustrative process 1100 for transmitting data according to embodiments of the present disclosure. At step 1102, the symbol encoder 62 may encode one or more data streams to be sent to one or more receivers via the cable 16. In embodiments, the symbol encoder 62 may use various types of modulation technique, such as Quadrature Amplitude and phase modulation (QAM) and Quadrature phaseshift keying (QPSK), to modulate the transmission data 60. Optionally, at step 1104, the precoder 64 may precode the encoded data streams according to the coefficient matrix 810. At step 1105, the modulator may create multicarrier symbols and generate time-domain samples. Then, at step 1106, the plurality of precoded data streams may be transmitted through a plurality of waveguide-mode channels in the cable 16 at preferred frequencies.

Figure 12A:
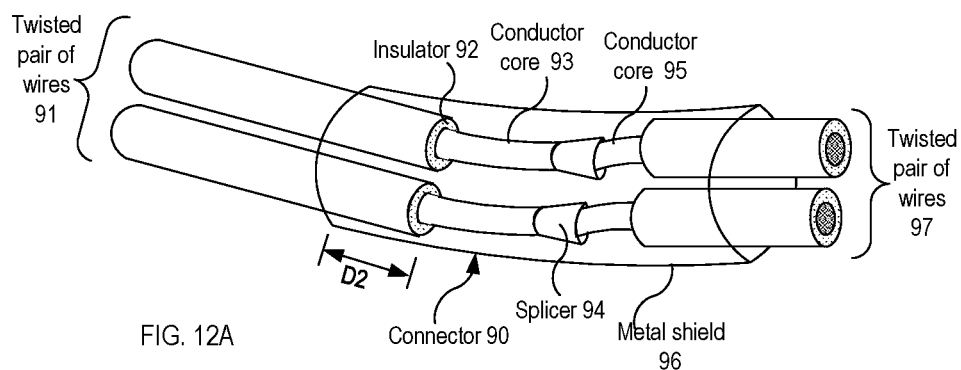
FIG. 12A shows a schematic diagram of a pair of wires connected to another pair of wires by a connector according to embodiments of the present disclosure.
Figure 12B:
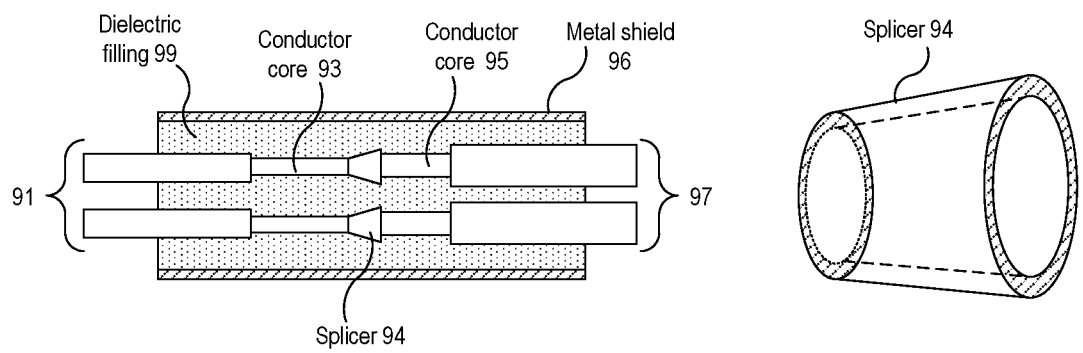
FIG. 12B shows a cross section view of the connector in FIG. 12A according to embodiments of the present disclosure.
Figure 12C:
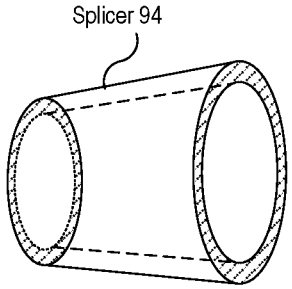
FIG. 12C is an enlarged view of a splicer according to embodiments of the present disclosure.

FIG. 12A shows a schematic diagram of a pair of wires 91 connected to another pair of wires 97 by a connector 90 according to embodiments of the present disclosure. FIG. 12B shows a cross section view of the connector 90 in FIG. 12A according to embodiments of the present disclosure. FIG. 12C is an enlarged view of the splicer 94 according to embodiments of the present disclosure.

As depicted, the twisted pair of wires 91 (and 97) may include two wires that each includes a conductor core 93 covered with an insulator 92. The connector 90 may include a metal shield 96, splicers 94 that couple the conductor cores 93 and 95, and dielectric material 99 that fills the inner space of the shield 96. The shield 96 and the dielectric filling 99 may firmly secure the first pair of wires 91 and the splicers 94 to the second pair of wires 97.

In embodiments, each splicer 94 may have a hollow frustum shape, where the inner diameters at both ends of each splicer may be larger than the outer diameters of the conductor cores 93 and 95. The splicer 94 may be formed of metal that is thicker than several skin depths of the waveguide-mode signals. It is noted that the proximal end of the conductor core 93 does not need to touch the distal end of the conductor core 95 since the waveguide modes may travel a few wavelengths from the proximal end of the conductor core 93. In embodiments, the overlap, D2, of the shield 96 with the insulator 92 may be several wavelengths of the waveguide-mode signals.

Figure 12D:
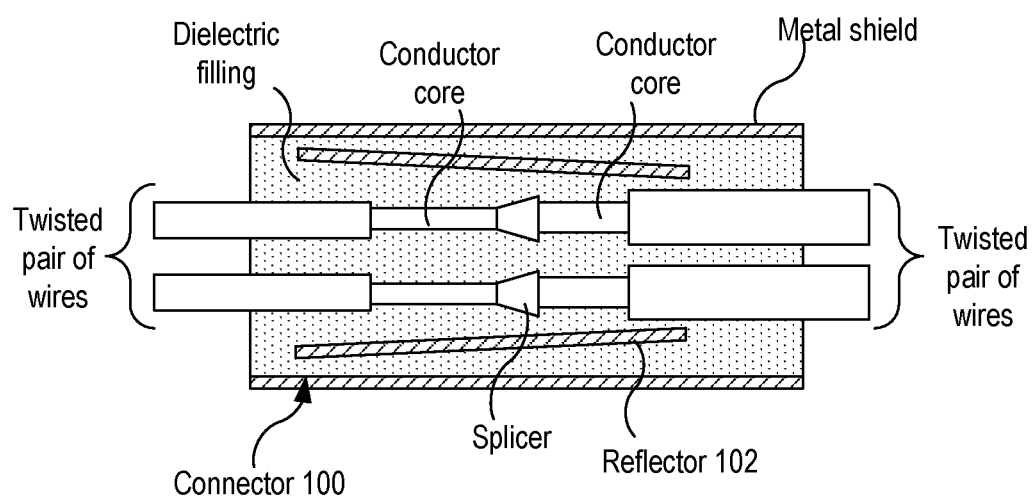
FIG. 12D shows a cross section view of a connector according to embodiments of the present disclosure.
Figure 12E:
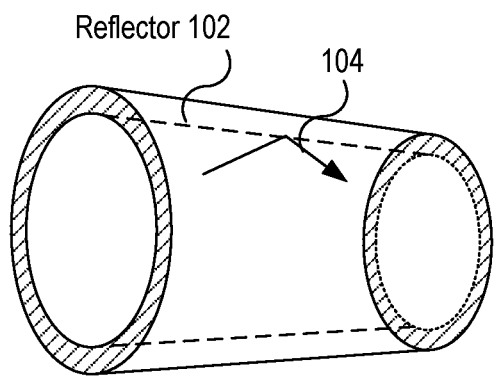
FIG. 12E is an enlarged view of a reflector according to embodiments of the present disclosure.

FIG. 12D shows a cross section view of a connector 100 according to embodiments of the present disclosure. The connector 100 may be similar to the connector 90, with the difference that a reflector 102 may be included in the connector 100. FIG. 12E is an enlarged view of the reflector 102 according to embodiments of the present disclosure. In embodiments, the reflector 102 may be formed of metal and have a shape of hollow frustum. The reflector 102 may reflect the waveguide-mode signals 104 toward to the center of the connector 100, as indicated by the arrow 104, so that the corresponding waves are confined within the reflector 102.

System Analysis

For the purpose of illustration, an analysis of the system performance has been performed.

Channel Model:

The channel insertion loss may be modeled by a conventional transmission line theory as long linear in frequency and distance. Measured values for the attenuation coefficient on conductor cores of the same diameter as phone lines can be expressed as $$H(f)=\exp(-0.05*(f/10^{11})*d) \qquad \text{Eq. (1)}$$

where d is the diameter in meters and f is frequency in Hz.

Crosstalk interference between twisted pairs may be highly random and depend on the twisting of the various pairs of wires relative to one another. However, the log-normal model is well known to approximate (when averages are taken over the ensemble of the distribution) crosstalk in twisted-pair cable models, where the crosstalk contribution from all other pairs to a single wire may be expressed as $$X(f)=10^{(k/10)}*\exp(-0.05*(f/10^{11})*d) \qquad \text{Eq. (2)}$$

where k is log-normal distributed with the mean at 0 db and variance of 9.0 db.

Transmission Speeds and Improvements from the Invention

Discrete multitone (DMT) systems are used heavily in xDSL transmission. That structure is re-used in the present disclosure, just with wider bandwidths, and may support a vectored implementation. A software simulation of the system described here was constructed and run. The specific simulation parameters include 20 dBm total transmission power, float transmit PSD, 2048 or 4096 sub-carriers in frequency bands ranging between 60 GHz to 500 GHz, with various sub-carrier spacing, Bit loading from 1 to 12 bits/Hz, 10% phy-layer overhead removed before presenting results, 4.5 db coding gain, 1.5 db implementation loss, −160 dbm/Hz background AWGN, 100 channels, vector precoded with either zero-forcing linear precoder or non-linear precoder (NLP) using generalized decision feedback equalization (GDFE), and Ideal channel estimation is assumed.

Figure 13:
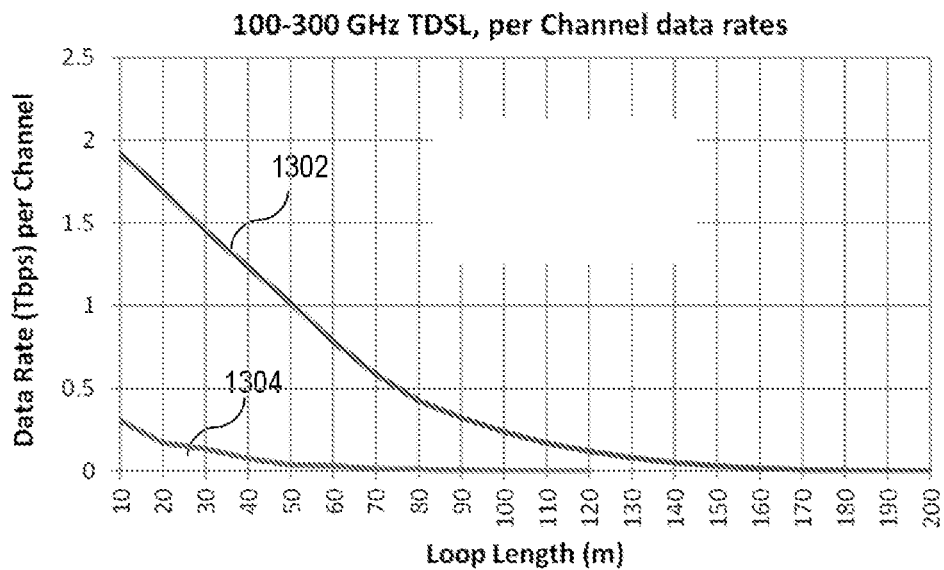
FIG. 13 shows a plot of data rates on a single wire vs. loop length according to embodiments of the present disclosure.

For the model above, the consequent data rates are shown in FIG. 13 for each polarization of each wire. In FIG. 13, the upper curve 1302 represents a data rate per channel (in the unit of Tbps) as a function of loop length (in the unit of meter) when a non-linear GDFE precoder is used to precode the downstream signal. Likewise, the lower curve 1304 represents a data rate per channel (in the unit of Tbps) as a function of loop length (in the unit of meter) when a linear precoder is used to precode the downstream signal. In FIG. 13, the data rate is the data transmission rate averaged across the 100 channels.

Figure 14:
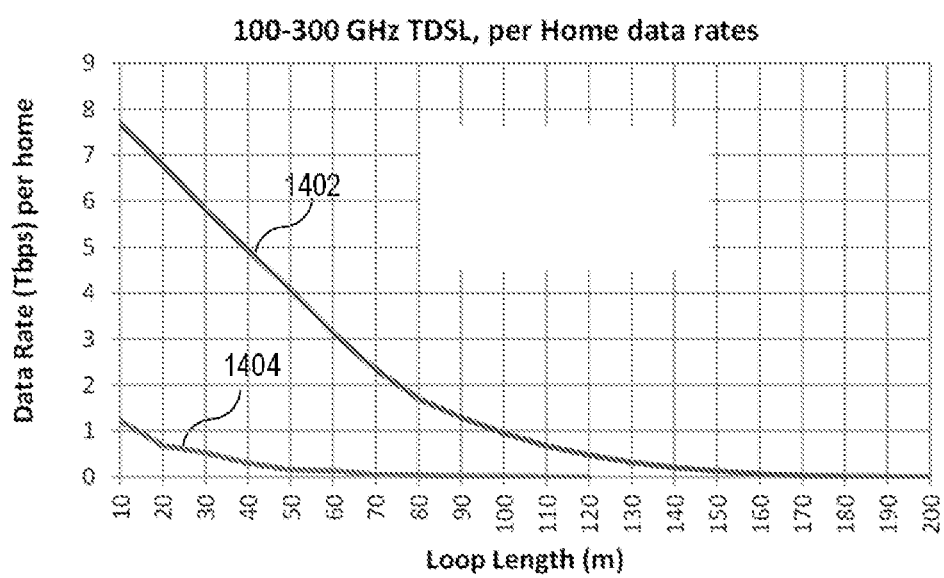
FIG. 14 shows a plot of data rates on two twisted pairs vs. loop length according to embodiments of the present disclosure.

FIG. 14 shows a plot of data rates vs. loop length according to embodiments of the present disclosure. In FIG. 14, the upper curve 1402 represents a data rate per receiver (in the unit of Tbps) as a function of loop length (in the unit of meter) when a non-linear GDFE precoder is used to precode the downstream signal. Likewise, the lower curve 1404 represents a data rate per receiver (in the unit of Tbps) as a function of loop length (in the unit of meter) when a linear precoder is used to precode the downstream signal. In FIG. 14, the data rate is the data transmission rate per home averaged across all 100 channels. Since each home has a phone cable that has two wires and each wire can have two channels (or modes) of transmission, the data rates in FIG. 14 are about 4 times as high as the data rates in FIG. 13.

Figure 15:
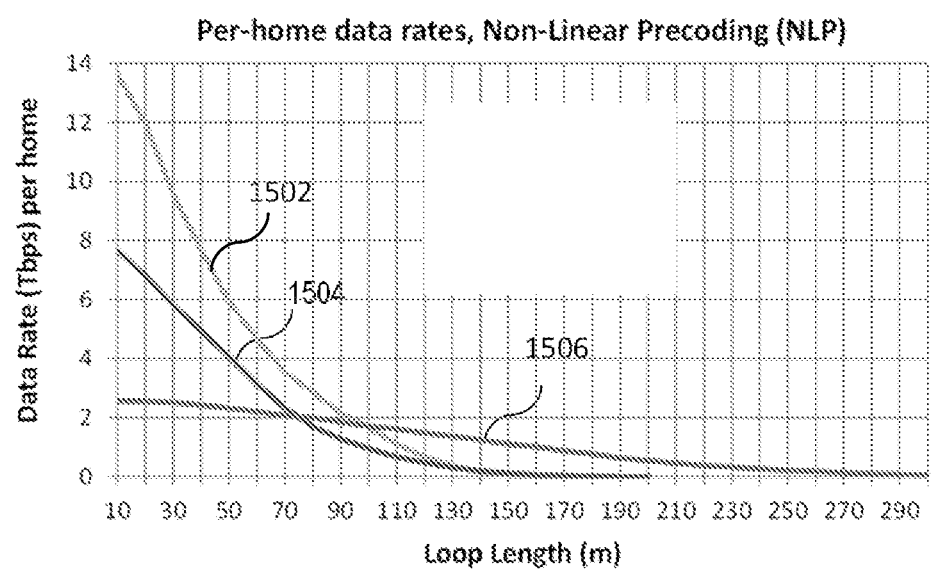
FIG. 15 shows a plot of data rate per receiver as a function of loop length at various frequencies according to embodiments of the present disclosure.

FIG. 15 shows a plot of data rate per receiver as a function of loop length (in the unit of meter) according to embodiments of the present disclosure. A non-linear precoder is used to generate the plot in FIG. 15. As depicted, the three curves represent data rate for three different frequency ranges: 100-500 GHz (1502), 100-300 GHz (1504) and 60-120 GHz (1506), where the data rate decreases as the loop length increases.

Figure 16:
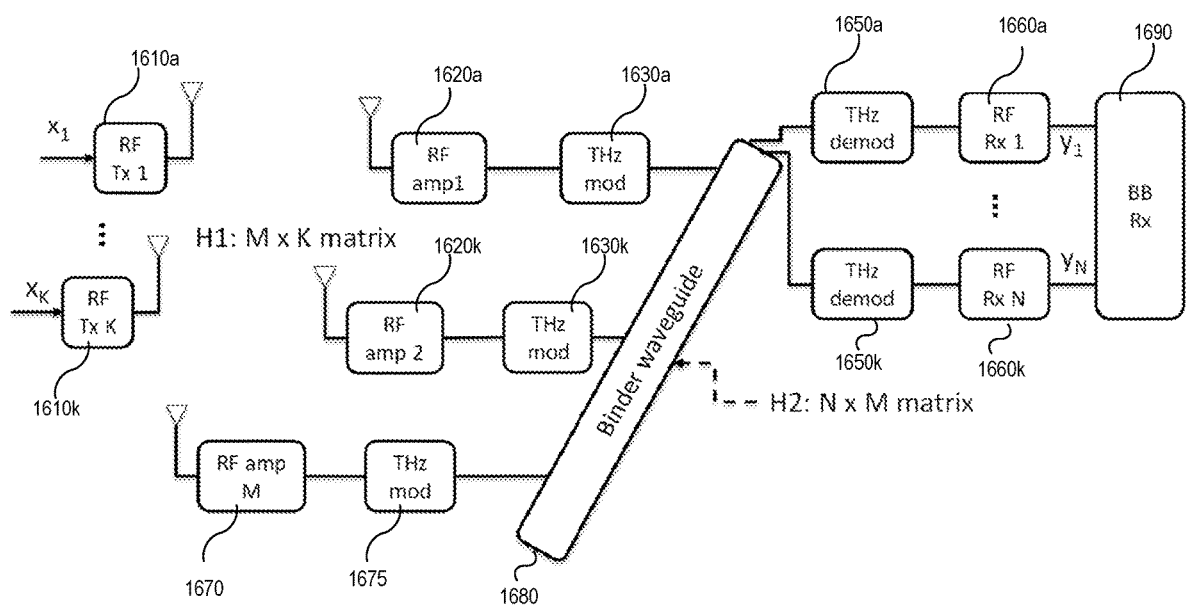
FIG. 16 is an exemplary system according to various embodiments of the present disclosure.

FIG. 16 illustrates a system in which wireless signals are transmitted between air interfaces and subsequently communicated across a high-speed waveguide structure according to various aspects of the invention. As shown, the system comprises a plurality of Radio Frequency (RF) transmitters 1610a . . . 1610k from which wireless signals are transmitted. The wireless signals are received at a plurality of receiver antennas and amplified by amplifiers 1620a . . . 1620k and modulated by a plurality of modulators 1630a . . . 1630k. The rate of signals may vary in accordance with different embodiments of the invention. As illustrated, these exemplary signals are operating within the near- and TeraHertz frequency ranges, but other frequencies are supported by the invention. The modulated signals are transmitted into a binder waveguide 1680 that transports the signals through the waveguide structure in accordance with the various methods described above.

The binder wave 1680 may receive signals from other sources such as the illustrated receiver with corresponding RF amplifier 1670 and modulator 1675. One skilled in the art will recognize that a large number of signal sources may be supported by the different embodiments of the invention.

The output of the binder waveguide 1680 may interface with one or more paths to further process the signals. In this example, the output is coupled to a plurality baseband down-conversion paths corresponding to the wireless signals transmitted by wireless transmitters 1610a . . . 1610k. Each of these paths may include various components including demodulators 1650a . . . 1650k, RF receivers 1660a . . . 1660k and corresponding baseband receiver 1690. One skilled in the art will recognize that other components may be included in both up-conversion and down-conversion.

In various embodiments of the invention, the modulator 1630a and demodulator 1650a convert RF radio signals to the frequencies carried on the binder waveguide 1680. Various embodiments, both structurally and functionally, of the binder waveguide 1680 are described above. Signals can be shifted between frequencies appropriate to the wire waveguide interface and frequencies appropriate to the radio interface. Up-conversion is the process of shifting a set of frequencies to a higher frequency band, and down-conversion is the process of shifting a set of frequencies to a lower frequency band. Additional modulation/demodulation steps may be performed so that the modulation format is appropriate to RF on the radio interfaces, and the modulation format is appropriate to waveguide transmission on the wires. There may also be additional signal processing, such as precoding and post-cancellation on the input and output of the wire waveguides. In the alternative, there may be no electrical conversion other than directly coupling the wire waveguide signals to the radio interface with antennas. In an embodiment, analog modulators and analog demodulators are used. Then, the received signals at the output of RF Rx 1 to RF Rx N can be written as the following equation $$\begin{bmatrix} Y_1 \\ \vdots \\ Y_N \end{bmatrix} = \begin{bmatrix} H_{2,11} & \cdots & H_{2,1M} \\ \vdots & \ddots & \vdots \\ H_{2,N1} & \cdots & H_{2,NM} \end{bmatrix}$$

$$\left( \begin{bmatrix} H_{1,11} & \cdots & H_{1,1K} \\ \vdots & \ddots & \vdots \\ H_{1,M1} & \cdots & H_{1,MK} \end{bmatrix} \begin{bmatrix} X_1 \\ \vdots \\ X_N \end{bmatrix} + \begin{bmatrix} N_{1,1} \\ \vdots \\ N_{1,M} \end{bmatrix} \right) + \begin{bmatrix} N_{2,1} \\ \vdots \\ N_{2,N} \end{bmatrix},$$

where H1,mk is the channel between RF Tx k and RF amp m; H2,kn is the baseband channel between the kth THz modulator and the nth THz demodulator. If N>=M>=K and if H1 and H2 are full rank matrices, H2*H1 is full rank; therefore, the RF Tx and RF Rx pairs will see the combined channel as a wireless MIMO channel and standard MIMO algorithms can be applied to RF Tx and RF Rx without requiring any signal processing in THz mod/demod. This embodiment and similar embodiments provide a level of simplification by combining both the RF and the waveguide MIMO processing. By using the binder waveguide with longer range to carry the RF signal, the range of communication systems can be increased significantly. A range or structures between these is possible, performing some functions with electrical devices and some functions passively.

The waveguide modes transmitted on wires can be used to distribute high-frequency signals throughout an entire building or campus environment, with conversion to and from wireless providing wireless coverage in each room or area. Examples of these modes are provided above.

One skilled in the art will recognize the advantages of employing high-speed connectivity between base stations, microcell towers, Wi-Fi access points, remote radio heads (RRHs), baseband units (BBUs), mobile switching centers, etc., where coordination or an exchange of information between these devices may be provided to optimize network performance. For example, in the case of 5G where base stations may coordinate both uplink and downlink communication within one or more cells, the rate at which data is exchanged between these base stations is important to ensure proper operation. Additionally, this point-to-point communication may leverage at least partially existing wires/cables that have already been installed. The use of the above-described communication techniques may be applied to other backhaul systems within today's and future wireless systems which will allow a more efficient, and faster deployment of higher-speed system by leveraging previously installed cabling and wire.

Figure 17:
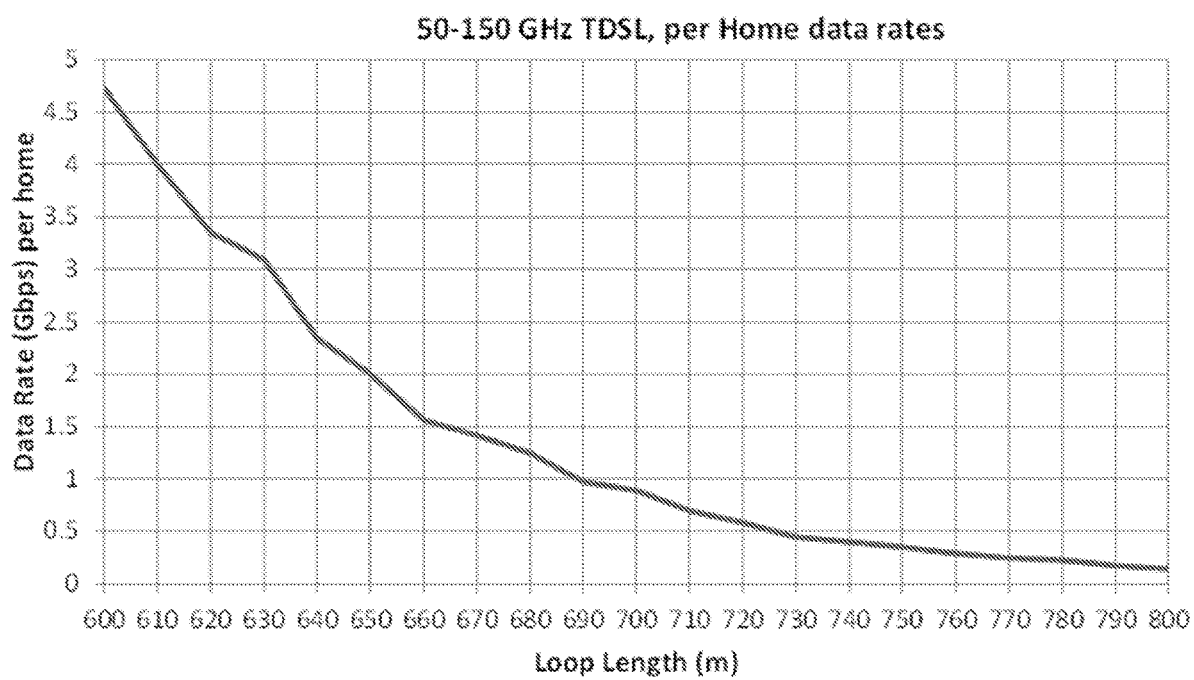
FIG. 17 illustrates a data rate plot per home as a function of loop length in accordance with various embodiments of the present disclosure.

FIG. 17 illustrates a data rate plot per home as a function of loop length in accordance with various embodiments of the present disclosure. In this example, a non-linear precoder is used to generate the plot with simulations being the same as those shown in FIGS. 13-15, except an assumption that a low-rate modulation can support bit loading within an appropriate range (e.g., 0-12 bits/Hz). In addition, the transmit spectra are optimized for long reach applications.

Embodiments of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure.

What is claimed is:

1. A data transmission device comprising:
    a transmitter that transmits a data-carrying signal over a transmission medium having waveguide properties and supporting a plurality of waveguide modes, the transmitter comprises a precoder that precodes a signal for transmission across a plurality of antennas and excites a first waveguide mode within the plurality of waveguide modes;
    the plurality of antennas transmits the precoded signal onto the transmission medium based on a training method that transmits a plurality of signals through the plurality of antennas to determine precoder parameters;
    wherein the training method providing a plurality of channel response measurements across a plurality of insertion angles into the signal-carrying media, wherein further frequencies, amplitudes and phases of the concurrently transmitted signals, the plurality of insertion angles into the signal-carrying media, amplitudes and phases being defined by a precoder coefficient matrix; and
    wherein the transmission medium comprises a set of waveguides that have been formed in gaps between two or more wires to transmit electromagnetic waves, wherein at least a portion of the surfaces of the two or more wires serve as waveguide boundaries.

2. The device of claim 1 further comprising a calibration unit coupled within the transmitter, the calibration unit transmits a plurality of test signals into the transmission medium to determine the precoder parameters.

3. The device of claim 2 wherein the calibration unit adjusts settings across a vector precoder within the transmitter, the adjustable settings cause precoder parameters of the plurality of test signals to change based on vector weights generated within the precoder and applied to at least one antenna within the plurality of antennas.

4. The device of claim 3 wherein the preferred precoder parameters are selected based at least in part on feedback from a remote receiver, the feedback identifying a detectability characteristic of at least one of the test signals.

5. The device of claim 4 wherein the detectability characteristic is a signal-to-noise measurement of the at least one of the test signals.

6. The device of claim 1 wherein the precoder is a type selected from a group consisting of: linear, zero-forcing, minimum mean squared error (MMSE), non-linear, generalized decision feedback equalizer (GDFE).

7. The device of claim 1 wherein the signal is transmitted to a second storage device.

8. The device of claim 1 further comprising a symbol encoder coupled within the transmitter, the symbol encoder encodes data on the signal prior to transmission onto the transmission medium.

9. The device of claim 8 further comprising a modulator coupled within the transmitter, the modulator converts the encoded first signal to a passband signal.

10. The device of claim 1 wherein the precoder that performs vectored signal processing on a plurality of signals to distinguish waveguide modes and increase data transfer rates.

11. The device of claim 1 wherein wherein at least some of the waveguides in the set of waveguides transmit a plurality of signals simultaneously.

12. The device of claim 11 wherein each of at least two signals is transmitted on a different carrier frequency.

13. The device of claim 1 wherein at least some of the waveguides in the set of waveguides transmit a plurality of signals simultaneously.

14. The device of claim 1 further comprising a polarizer coupled to the transmitter, the polarizer converts a polarization of the precoded signal received from the transmitter to a first polarization related to a coupling of at least one waveguide mode within the plurality of waveguide modes.

15. The device of claim 1 wherein the plurality of waveguide modes comprises at least one mode selected from a group consisting of: transverse magnetic, plasmon traverse electro-magnetic, transmission-line, total internal reflection, and transverse electric modes.

16. A data reception device for receiving signals comprising:
- a plurality of antennas that receives precoded signals from a transmission medium, the precoded signals being generated based on a training method that transmits the precoded signals onto the transmission medium having waveguide properties and supporting a plurality of transmission modes, each of the precoded signals propagating in a corresponding transmission mode related to the precoder parameters used to generate at least one of the precoded signals;
- a receiver coupled to receive the precoded signals from the plurality of antennas, the receiver comprises a channel response feedback processor that receives each of the precoded signals and determines a plurality of channel response measurements across a plurality of frequencies and precoder parameters of each of the precoded signals;
- wherein the training method providing a plurality of channel response measurements across a plurality of insertion angles into the signal-carrying media, wherein further frequencies, amplitudes and phases of the concurrently transmitted signals, the plurality of insertion angles into the signal-carrying media, amplitudes and phases being defined by a precoder coefficient matrix; and
- wherein the transmission medium comprises a set of waveguides that have been formed in gaps between two or more wires to transmit electromagnetic waves, wherein at least a portion of the surfaces of the two or more wires serve as waveguide boundaries.

17. The device of claim 16 further comprising:
- a sensor coupled within the receiver, the sensor converts an electromagnetic wave corresponding to a first precoded signal to an electrical signal;
- a vector post-canceller coupled to receive the electrical signal, the vector post-canceller reduces interference on the first electrical signal;
- a demodulator coupled to receive the electrical signal, the demodulator coverts the electrical signal from a passband electrical signal to a baseband electrical signal;
- a symbol decoder coupled to receive the set of received symbols, the symbol decoder decodes data from the set of received symbols.

18. The device of claim 17 further comprising a symbol decoder coupled within the receiver, the symbol decoder decodes data on the first precoded signal.

19. The device of claim 1, further comprising an antenna mounted around a wire to couple electromagnetic waves into one or more waveguide modes at a GHz or THz frequency range.

20. The device of claim 1, further comprising using a polarizer that aligns the electromagnetic waves to a polarization of a waveguide mode that is transmitted in a waveguide and a lens that focusses the electromagnetic waves onto the waveguide.

* * * * *